US012248602B2

(12) United States Patent
Nalluri et al.

(10) Patent No.: US 12,248,602 B2
(45) Date of Patent: Mar. 11, 2025

(54) METHODS AND APPARATUS TO ORCHESTRATE PERSONAL PROTECTION ACROSS DIGITAL ASSETS

(71) Applicant: McAfee, LLC, San Jose, CA (US)

(72) Inventors: Srikanth Nalluri, Bangalore (IN); Dattatraya Kulkarni, Bangalore (IN); Raghavendra Hebbalalu, Bangalore (IN); Sandeep Swastik, Bangalore (IN); Piyush Pramod Joshi, Aurangabad (IN); Samrat Chitta, Bangalore (IN); Partha Sarathi Barik, Bangalore (IN)

(73) Assignee: MCAFEE, LLC, San Jose, CA (US)

( * ) Notice: Subject to any disclaimer, the term of this patent is extended or adjusted under 35 U.S.C. 154(b) by 431 days.

(21) Appl. No.: 17/459,999

(22) Filed: Aug. 27, 2021

(65) Prior Publication Data

US 2022/0269817 A1     Aug. 25, 2022

Related U.S. Application Data

(60) Provisional application No. 63/151,538, filed on Feb. 19, 2021.

(51) Int. Cl.
   *G06F 21/62*    (2013.01)
   *H04L 9/40*     (2022.01)

(52) U.S. Cl.
   CPC ...... *G06F 21/6245* (2013.01); *H04L 63/1416* (2013.01); *H04L 63/1441* (2013.01)

(58) Field of Classification Search
   CPC ............ G06F 21/6245; H04L 63/1416; H04L 63/1441
   See application file for complete search history.

(56) References Cited

U.S. PATENT DOCUMENTS 8,495,745 B1   7/2013  Schrecker et al.
10,111,099 B2  10/2018 Hunt et al.
(Continued)

FOREIGN PATENT DOCUMENTS

CN    111475804 B  * 10/2023  ............. G06F 18/23
WO    2021028060 A1   2/2021

OTHER PUBLICATIONS

Pavel Yermalovich • Mohamed Mejri; Information security risk assessment based on decomposition probability via Bayesian Network; 2020 International Symposium on Networks, Computers and Communications (ISNCC) (2020, pp. 1-8); (Year: 2020).*

(Continued)

*Primary Examiner* — Luu T Pham
*Assistant Examiner* — Chao Wang
(74) *Attorney, Agent, or Firm* — Hanley, Flight & Zimmerman, LLC

(57) ABSTRACT

Methods, apparatus, systems, and articles of manufacture for orchestrating personal protection across digital assets are disclosed. An example apparatus includes at least one memory, instructions in the apparatus, and processor circuitry to execute the instructions to monitor digital assets associated with a protection threat surface to detect a protection event, determine one or more protection vectors associated with the digital assets in response to detecting the protection event, the one or more protection vectors including one or more values corresponding to an impact of the protection event on an overall protection posture associated with the protection threat surface, and determine protection remediation action for the digital assets based on the one or more protection vectors.

30 Claims, 14 Drawing Sheets

(56) References Cited

U.S. PATENT DOCUMENTS

| | | | |
|---|---|---|---|
| 2013/0340084 A1 | 12/2013 | Schrecker et al. | |
| 2017/0026401 A1* | 1/2017 | Polyakov | H04L 63/20 |
| 2019/0281082 A1* | 9/2019 | Carmichael | G06F 21/577 |
| 2020/0351294 A1* | 11/2020 | Davis | H04L 63/1433 |
| 2022/0070198 A1* | 3/2022 | Willis | H04L 63/1425 |

OTHER PUBLICATIONS

Asad Arfeen • Saad Ahmed • Muhammad Asim Khan • Syed Faraz Ali Jafri; Endpoint Detection & Response: A Malware Identification Solution; 2021 International Conference on Cyber Warfare and Security (ICCWS) (2021, pp. 1-8); (Year: 2021).*

Bashayer Alshehhi • Halim Khelalfa • Shafiz A Mohd Yusof; Scenario Intelligence: Modeling Insider Threats for Effective Anomaly Detection Using Real Life Scenarios; 2023 24th International Arab Conference on Information Technology (ACIT) (2023, pp. 1-9); (Year: 2023).*

United States Patent and Trademark Office, "Non-Final Office Action," issued in connection with U.S. Appl. No. 17/459,979, mailed on Apr. 11, 2023, 23 pages.

International Searching Authority, "International Preliminary Report on Patentability," issued in connection with International Patent Application No. PCT/US2022/015267, issued on Aug. 22, 2023, 8 pages.

International Searching Authority, "International Search Report", issued in connection with International Application No. PCT/US2022/015267, dated May 12, 2022, 5 pages.

International Searching Authority, "Written Opinion", issued in connection with International Application No. PCT/US2022/015267, dated May 12, 2022, 8 pages.

Nageab et al., "Cybersecurity in the Era of Artificial Intelligence: Risks and Solutions," ASU International Conference in Emerging Technologies for Sustainability and Intelligent Systems (ICETSIS), 2024, 6 pages.

Cavalli et al., "Cybersecurity, Monitoring, Explainability and Resilience," Fourteenth International Conference on Mobile Computing and Ubiquitous Network (ICMU), 2023, 7 pages.

Fakhouri et al., "AI-Driven Solutions for Social Engineering Attacks: Detection, Prevention, and Response," 2nd International Conference on Cyber Resilience (ICCR), 2024, 8 pages.

United States Patent and Trademark Office, "Advisory Action," issued in connection with U.S. Appl. No. 17/459,979, dated Dec. 18, 2023, 3 pages.

United States Patent and Trademark Office, "Notice of Allowance and Fee(s) Due," issued in connection with U.S. Appl. No. 17/459,979, dated Jun. 13, 2024, 18 pages.

United States Patent and Trademark Office, "Final Office Action," issued in connection with U.S. Appl. No. 17/459,979, dated Oct. 13, 2023, 30 Pages.

* cited by examiner

| PROTECTION OPERATION | DEVICE | CLOUD |
|---|---|---|
| DISCOVER | DISCOVER MY APPLICATIONS | DISCOVER ALL MY ONLINE ACCOUNTS |
| DETECT | DETECT MY APPLICATIONS WITH LOW REPUTATION | DETECT MY PASSWORDS THAT HAVE LOW STRENGTH |
| PREVENT | PREVENT APPS WITH LOW REPUTATION FROM ACCESSING MY SENSORS | PREVENT PASSWORDS FROM BECOMING STALE; PROMPT USER TO UPDATE PASSWORDS PERIODICALLY |
| CORRECT | UNINSTALL APPS WITH LOW REPUTATION | SCAN AND DELETE SOCIAL MEDIA POSTS WITH USER'S PII DATA |

FIG. 3

| THREAT CLASSIFICATION | DEVICE | CLOUD |
|---|---|---|
| TRUST | I TRUST MY DEVICE AS I HAVE ANTI-MALWARE INSTALLED ON IT | I AM SAFE AND PROTECTED DURING MY ONLINE INTERACTIONS |
| IDENTITY | UNAUTHORIZED ACCESS TO MY DATA IS PREVENTED AS IT IS ENCRYPTED | HAVE MY PII DATA BEEN EXPOSED VIA A DATA BREACH? |
| PRIVACY | USE OF VPN FOR MY FINANCIAL TRANSACTIONS | ARE PRIVACY SETTINGS ON MY SOCIAL NETWORK ACCOUNTS APPROPRIATE? |
| SECURITY | PROTECTION FROM FILELESS MALWARE, & RANSOMWARE | FINANCIAL TRANSACTION PROTECTION FROM MAGECART-LIKE ATTACKS |

FIG. 4

METHODS AND APPARATUS TO ORCHESTRATE PERSONAL PROTECTION ACROSS DIGITAL ASSETS

RELATED APPLICATION

This patent arises from U.S. Patent Application Ser. No. 63/151,538, which was filed on Feb. 19, 2021. U.S. Patent Application No. 63/151,538 is hereby incorporated herein by reference in its entirety. Priority to U.S. Patent Application No. 63/151,538 is hereby claimed.

FIELD OF THE DISCLOSURE

This disclosure relates generally to digital security and, more particularly, to methods and apparatus to orchestrate personal protection across digital assets.

BACKGROUND

Digital security is focused on device security, such as protecting a device from software threats like viruses and other malware. As technology advances, digital interactions and digital platforms increasingly permeate daily activities of many people. As a result, a landscape of potential security threats has expanded to include other threats beyond traditional device-centric security threats. For example, various online security threats could potentially compromise user privacy, identity, security, and/or trust in online services.

BRIEF DESCRIPTION OF THE DRAWINGS

FIG. 3 illustrates example protection operations performed by the example protection circuitry of FIG. 2 to protect the example local digital assets and the example cloud digital assets of FIG. 1.

FIG. 4 illustrates example threats addressed by the example protection circuitry of FIG. 2 to protect the example local digital assets and the example cloud digital assets of FIG. 1.

Figure 1:
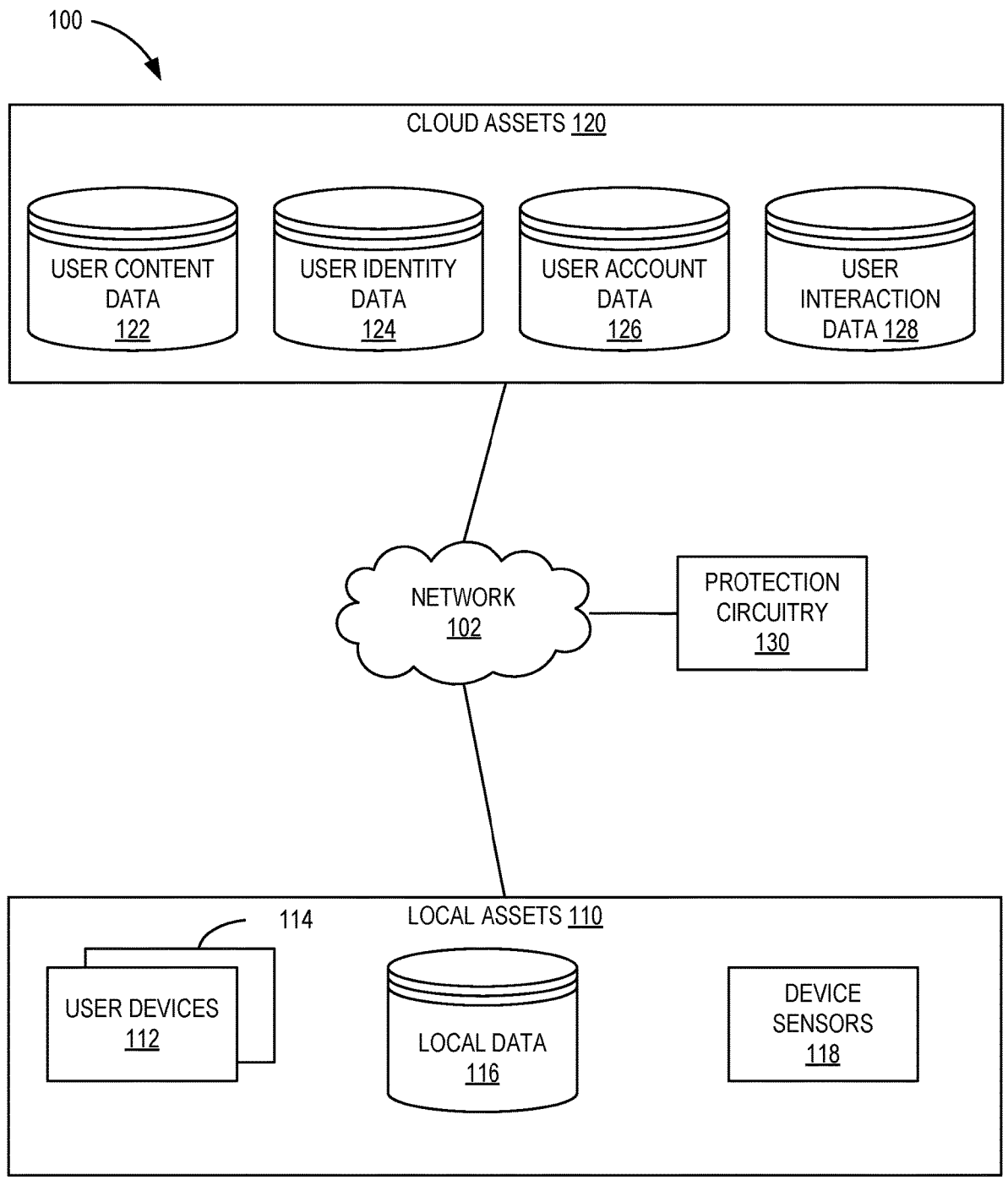
FIG. 1 is a block diagram of an example networked environment that includes example digital assets associated with one or more users.

The figures are not to scale. Instead, the thickness of the layers or regions may be enlarged in the drawings. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As used herein, a model is a set of instructions and/or data that may be ingested, processed, interpreted and/or otherwise manipulated by processor circuitry to produce a result. Often, a model is operated using input data to produce output data in accordance with one or more relationships reflected in the model. The model may be based on training data.

As used herein, the term "digital asset" includes various digital entities associated with a user, such as any combination of computing devices (e.g., laptop computer, smart phone, tablet computer, etc.), online accounts (e.g., email account), passwords, private information, user data, applications (e.g., computer programs), device peripherals (e.g., a camera of a cellular phone, etc.), uniform resource locators (URLs), online user interactions, network connections, and/or any other type of digital entity. In some examples, a digital asset may also include any digital entity that is at rest (e.g., data stored in a physical data storage device), in transit (e.g., data being transmitted over a network), local (e.g., data or device directly accessible to the user without necessarily using a network), cloud based (e.g., data or device accessible to the user via a network), shared (e.g., a shared online account associated with multiple users), unshared (e.g., data associated with a single user), user-provided (e.g., data received from the user, device indicated by the user, etc.), and/or service-derived (e.g., user account data prepared by an online service and for a user account of the user), among other examples.

As used herein, "a protection event" corresponds to a configuration of a digital asset and/or an action performed on or encountered by a digital asset that can be conducive to personal protection or detrimental to personal protection. For example, the "protection event" can cause a digital asset and/or information associated therewith to be secure or unsecure and, thus, accessible by unwanted parties (e.g., via malware). Accordingly, the "protection event" can be indicative of a state or configuration of protection capabilities associated with a digital asset.

Digital interactions of consumers have expanded significantly, as digital platforms have permeated most of the jobs that users do in a day. Threats to digital assets associated with a user have expanded from mere devices and data that need to be protected from malware to all user digital assets that span across multiple devices, cloud accounts/services, and online interactions. Accordingly, a landscape of threats that a user encounters has expanded past the protection provided by device centric antiviruses into various online and user centric threats, especially in consumer digital space. For example, the landscape of threats now exploit a privacy, identity, security, and/or trust associated with a digital asset to steal data, information, and/or content associated with one or more users. Accordingly, a digital asset must have a broad range of protections that matches a context associated with the user(s) to address potential issues associated with the privacy, identity, security, and/or trust.

However, security is traditionally limited to device security and, more specifically, to security that protects the device and data associated therewith from threats. Measurements of an accuracy of detection and/or remediation of threats have matured over time, but have remained in the realm of traditional device, data, and connection security. Moreover, as the security program provides numerous alerts and notifications to the device in an attempt to address potential threats, users are unable to decipher an overall severity of the threats against the digital assets. As such, the users may ignore such alerts and notifications as they carry on with their activities without an overall understanding of an impact associated with the threats. Accordingly, a digital asset may be exploited (e.g., via malware, hacking, data theft, etc.) by a malicious entity to cause a loss (e.g., a monetary loss, an emotional loss, etc.) to an owner of the digital asset.

Example methods and apparatus to orchestrate personal protection are disclosed herein. For example, an analysis of the overall protection posture of the one or more users may prevent security threats from affecting user devices, cloud accounts, cloud services, online interactions, and/or any other digital assets associated with the user(s). Examples disclosed herein orchestrate protection recommendations and/or authorized protection controls to address security, privacy, identity, and trust threats for one or more users. Accordingly, examples disclosed herein provide protection beyond device-centric threats (e.g., against malicious files, uniform resource locators (URLs), fileless malware, etc.) to protect against various threats that affect user privacy, identity, and/or trust.

To facilitate protection against such malicious entities, some examples disclosed herein identify and monitor digital assets associated with one or more users. For example, processor circuitry may scan and/or monitor one or more user devices to identify various other digital assets (e.g., local assets, cloud assets, etc.) associated with the user(s). As such, the processor circuitry can determine a protection threat surface for the one or more users, which includes all of the digital assets associated with the one or more users. In some examples, the digital assets that form the protection threat surface belong to a group of related users (e.g., members of a family, users residing in a same home, etc.).

In examples disclosed herein, example processor circuitry includes a network of software sensors sense protection events corresponding to threats associated with digital assets. The protection events can be indicative of configurations or settings associated with the digital assets, external actions encountered by the digital assets, and/or user actions performed on the digital assets that affect a protection posture of the user. For example, the software sensors can be distributed across a plurality of user devices and/or other digital assets associated with the user(s). In some examples, the software sensors are embedded in protection capabilities (e.g., anti-virus software, etc.) associated with the digital assets.

In examples disclosed herein, the example processor circuitry includes a data pipeline that aggregates the protection events that affect an overall protection posture of the user. As a result, the processor circuitry can determine protection vectors associated with the digital assets based on the protection events. The protection vectors characterize potential threats for each digital asset across the protection threat surface. Accordingly, the protection threat surface may be contextual and/or personalized for the user(s) (e.g., depending on the digital assets associated with the user(s) and the associated protection vectors associated with the digital assets).

In examples herein, the processor circuitry continuously monitors for new digital assets and, in turn, determines protection vectors to associate with the new digital assets in response to a discovery thereof. For example, when a digital asset is an account that is accessible via a network, such as a bank account, the processor circuitry may assign a first protection vector to the digital asset corresponding to a strength of a password used to access the bank account, a second protection vector corresponding to an enablement of a password breach notification, and/or a third protection vector related to a security configuration of the bank account (e.g., whether a two-step verification setting is enabled, whether Virtual Private Network (VPN) is enabled while accessing the digital asset, whether a firewall is enabled while accessing the digital asset, etc.).

The protection vectors can correspond to protection capabilities associated with the corresponding digital asset. For example, the protection vectors can include values indicative of a type of the digital asset (e.g., a local digital asset, a cloud digital asset, etc.), a classification of the associated threat (e.g., security, privacy, identity, trust, etc.), and/or a type of protection capability associated with the protection vector (e.g., discovery of digital assets, detection of one or more types of threats, preventative action(s) against the threat(s), and/or correction of the threat(s)). In some examples, the processor circuitry assigns weights to the protection vectors corresponding to an impact of the protection vectors on the overall protection posture associated with the protection threat surface.

In examples herein, the processor circuitry determines a protection efficacy score (e.g., a quantified protection rating) indicative of an overall protection posture of the protection threat surface based on the protection vectors. In some examples, the processor circuitry aggregates the protection vectors (e.g., adds the protection vectors, averages the protection vectors, etc.) to determine an acquired score for the protection threat surface. Accordingly, the protection efficacy score can be based on the acquired score and a maximum acquirable score for the aggregated protection vectors associated with the protection threat surface. As such, the protection efficacy score can be a single score that is representative of the overall protection posture of the group of related users. In examples herein, the processor circuitry updates the protection efficacy score as the digital assets, protection capabilities, product versions, and/or user behavior evolves.

In examples herein, the processor circuitry can present the protection efficacy score to the associated user(s), which provides the user(s) with a clear and discrete understanding of the protection posture of the digital assets associated therewith. For example, when the user(s) sees a decrease in the protection efficacy score, the user(s) may be motivated to take action to counteract the threats encountered by the digital assets. That is, the decrease in the protection efficacy score can cause the user(s) to take actions recommended by the processor circuitry based on the protection events and protection vectors.

In examples disclosed herein, the example processor circuitry can determine protection remediation actions in response to the digital assets encountering protection events. For example, the processor circuitry can determine the protection remediation actions based on the encountered protection events, digital assets associated with the protection events, determined protection vectors and/or states resulting from the protection events, and user behaviors. The processor circuitry can utilize a rule-based model or a machine learning model to generate the protection remediation actions based on the respective digital asset and the protection vector or state and/or user behaviors associated therewith. In some examples, the example processor circuitry associates pre-conditions with the protection remediation actions that are to be satisfied for the associated protection remediation action to be generated. Thus, examples herein enable comprehensive protection orchestration and/or automation based on a dynamic and/or continuous assessment of threats across multiple user digital assets.

In examples disclosed herein, the processor circuitry can prioritize and/or rate the determined protection remediation actions based on an impact thereof on the protection posture associated with the protection threat surface. For example, the processor circuitry can rate the protection remediation actions based on respective improvements that the protection remediation actions cause in the protection efficacy score associated with the protection threat surface. Accordingly, the rating of the protection remediation actions can account for user context, user behavior, device context, and/or external protection context (e.g., trending online threats affecting other users, etc.) to improve protection associated with the protection threat surface. In some examples, the processor circuitry can determine one or more security capabilities that correspond to the protection efficacy score and, in turn, recommend the security capabilit(ies) to the user(s).

In some examples, the processor circuitry observes behaviors of the one or more users in response to providing the protection actions. For example, the processor circuitry can determine a time at which the user(s) utilizes certain devices and, in turn, determine when and where to provide a message and/or notification based on the observed user behaviors. Further, the processor circuitry can analyze the digital assets, a usage thereof, responses to notifications, and/or any other behavior of the user(s) to determine a notional value that the user(s) has for the respective digital assets.

FIG. 1 is a block diagram of an example environment 100 that includes example local digital assets 110 and example cloud digital assets 120 associated with one or more users, in accordance with the teachings of this disclosure. For example, the environment 100 or a portion thereof can be representative of an example protection threat surface associated with the user(s). In the illustrated example of FIG. 1, the environment 100 includes an example network 102 in connection with the example local assets 110 and the example cloud assets 120.

The example network 102 of FIG. 1 includes one or more data communication networks that communicatively couple various computing devices and/or other components of the environment 100. A non-exhaustive list of example implementations for the network 102 includes the Internet, local area networks, and wireless networks, among other examples.

The example local assets 110 of FIG. 1 include any digital assets (e.g., computing device, stored information, operating system account, local user profile, application, etc.) that are directly accessible to the user(s) of the environment 100 (e.g., without necessarily using the network 102). In the illustrated example of FIG. 1, the example local assets 110 include example user devices 112, 114, example local data 116, and example device sensors 118.

It is noted that the example illustration of FIG. 1 shows user devices 112, 114, local data 116, and device sensors 118 as independent blocks only for convenience in description. In some examples, one or more of the blocks representing the various components of the local assets 110 in the illustration of FIG. 1 can be alternatively combined and/or separated into fewer or more blocks than those shown. Further, in some examples, one or more components of the local assets 110 can be physically implemented as subcomponent(s) of one or both of the user devices 112, 114.

The example user devices 112, 114 include any type of computing device (e.g., desktop computer, tablet computer, smart phone, Internet-of-Things (IOT) device, network router, etc.) operated by the user of the environment 100. Although the illustrated example of FIG. 1 shows two user devices 112, 114, in alternative examples, the local assets 110 may include fewer or more user devices. In various example scenarios, security threats associated with the user devices 112, 114 (e.g., unauthorized online access by a malicious entity to the local data) can impact a privacy, identity, security, and/or trust associated with the environment 100.

The example local data 116 includes any data stored in a local data storage or memory of any of user devices 112 and/or 114. The local data 116 can be implemented using any type of data structure (e.g., computer files, databases, etc.) suitable for storing the local data 116 in one or more of the user devices 112. A non-exhaustive list of example local data 116 includes program applications, document data, image data, video data, among other examples. Thus, in various example scenarios, security threats associated with the local data 116 (e.g., unauthorized online access by a malicious entity to the local data) can impact a privacy, identity, security, and/or trust associated with the environment 100.

The example device sensors 118 include any sensors (e.g., cameras, microphones, etc.) that are communicatively coupled to and/or otherwise associated with the user devices 112 and/or 114 (e.g., internal or external hardware components of the user devices 112, 114). As an example of a potential privacy threat that involves the device sensors 118, a malicious entity (e.g., a hacker) could remotely operate (e.g., via network 102) one or more of the device sensors 118 (e.g., a built-in camera) included in the user device 112 (e.g., smart phone device, laptop computer, etc.) to capture images or videos without authorization from the user(s) associated with the user device 112. Thus, in various example scenarios, security threats associated with the device sensors 118 (e.g., unauthorized online access by a malicious entity to the local data) can impact a privacy, identity, security, and/or trust associated with the environment 100.

The example cloud assets 120 include any digital asset accessible to the user(s) of the environment 100 via the network 102. By way of example, the user(s) can access an online account (e.g., an account stored in a remote server) via one of the user devices 112, 114 by submitting login credentials (e.g., username and password) and/or other identification information to the remote server. In the illustrated example of FIG. 1, the cloud assets 120 include example user content data 122, example user identity data 124, example user account data 126, and example user interaction data 128.

It is noted that the various components of the cloud assets 120 are illustrated in FIG. 1 as the four blocks 122, 124, 126, and 128 only for convenience in description. In alternative examples, the various illustrated blocks of the cloud assets 120 can be alternatively combined and/or separated into fewer or more blocks. In some examples, the cloud assets 120 alternatively or additionally include more, fewer, and/or different cloud assets than those shown. A non-exhaustive list of other possible example cloud assets includes online accounts, such as email accounts, bank accounts, ecommerce accounts, cloud storage accounts, news service provider accounts, and/or entertainment portal accounts, among other examples.

The example user content data 122 includes user-submitted content (e.g., social media posts, comments, emails, images, videos, other online service data, or other types of user content) submitted by the user(s) of the user devices 112, 114 via the network 102 to a remote server (not shown) via the network 102. To that end, in some examples, the user content data 122 can be stored in one or more remote servers and/or intercepted by a malicious entity during transmission of the user content data 122 via the network 102. Additionally, in some examples, the user(s) of the environment 100 can authorize limited access to such user content (e.g., social media posts, etc.) for certain other user(s) that have access to the one or more remote servers. Thus, in various example scenarios, security threats associated with the user content data 122 (e.g., unauthorized online access by a malicious entity to the local data) can impact a privacy, identity, security, and/or trust associated with the environment 100.

The example user identity data 124 includes any identity information submitted by the user(s) to a remote server via the network 102 (e.g., payment information, social security number, demographics, etc.). Thus, in various example scenarios, security threats associated with the user identity data 124 (e.g., unauthorized online access by a malicious entity to the local data) can impact a privacy, identity, security, and/or trust associated with the environment 100.

The example user account data 126 includes any user-specific account data (e.g., login credentials, bank account information, user account data managed by an online service, etc.) accessible to the user(s) via the network 102. By way of example, an online service of a bank can be implemented on one or more remote servers (not shown) accessible via the network 102. The online service may include a web portal for the user(s) to access a bank account(s) of the user(s) remotely, such as to view bank account information (e.g., the user account data 126) and/or to sending instructions (e.g., payment instructions, etc.) pertaining to the bank account remotely via the online service. Thus, in various example scenarios, threats associated with the user account data 126 (e.g., unauthorized online access by a malicious entity to the bank account of the user or to any other online account of the user) can impact a privacy, identity, security, and/or trust associated with the environment 100.

The example user interaction data 128 includes any data indicating online interactions of the user(s) via the network 102. A non-exhaustive list of example user interaction data 128 includes web browser history data (e.g., web pages visited by the user(s) via a browser application on the user devices 112, 114), online form data (e.g., data submitted to a remote server by the user(s), etc.), and/or any other type of information indicating digital interactions of the user (e.g., with one or more remote servers) via the network 102. To that end, in some examples, the user interaction data 128 may be stored in data storage of one or more remote servers, intercepted by a malicious entity while during transmission over the network 102, tracked via one or more systems (e.g., cookies, online tracking systems, etc.) with or without authorization by the user(s), and/or extracted by another remote server from the local data 116 with or without authorization from the user(s), among other examples. As such, threats associated with the user interaction data 128 can impact a privacy, identity, security, and/or trust associated with the environment 100.

It is noted that the terms "local assets," "digital assets," and "local digital assets" may be used interchangeably herein in reference to local assets 110 and/or any other digital entity (e.g., data, device, etc.) directly accessible to the user of user devices 112, 114 without necessarily using the network 102. Further, it is noted that the terms "cloud assets," "digital assets," and "cloud digital assets" may be used interchangeably herein in reference to cloud assets 120 and/or any other digital entity (e.g., data, device, etc.) accessible to the user of the user devices 112, 114 via the network 102 (e.g., online services, cloud storage devices, data stored on a remote server, etc.).

In the illustrated example of FIG. 1, the environment 100 includes protection circuitry 130 in connection with the local assets 110 and the cloud assets 120 via the network 102. In some examples, the protection circuitry 130 is in connection with the local assets 110 and/or the cloud assets 120 directly (e.g., without the network 102). By way of example, the protection circuitry 130 can be implemented on one or more remote servers (not shown) accessible via the network 102 or the user devices 112, 114 directly. The protection circuitry 130 determines, analyzes, and manages a protection posture associated with the user(s).

Figure 2:
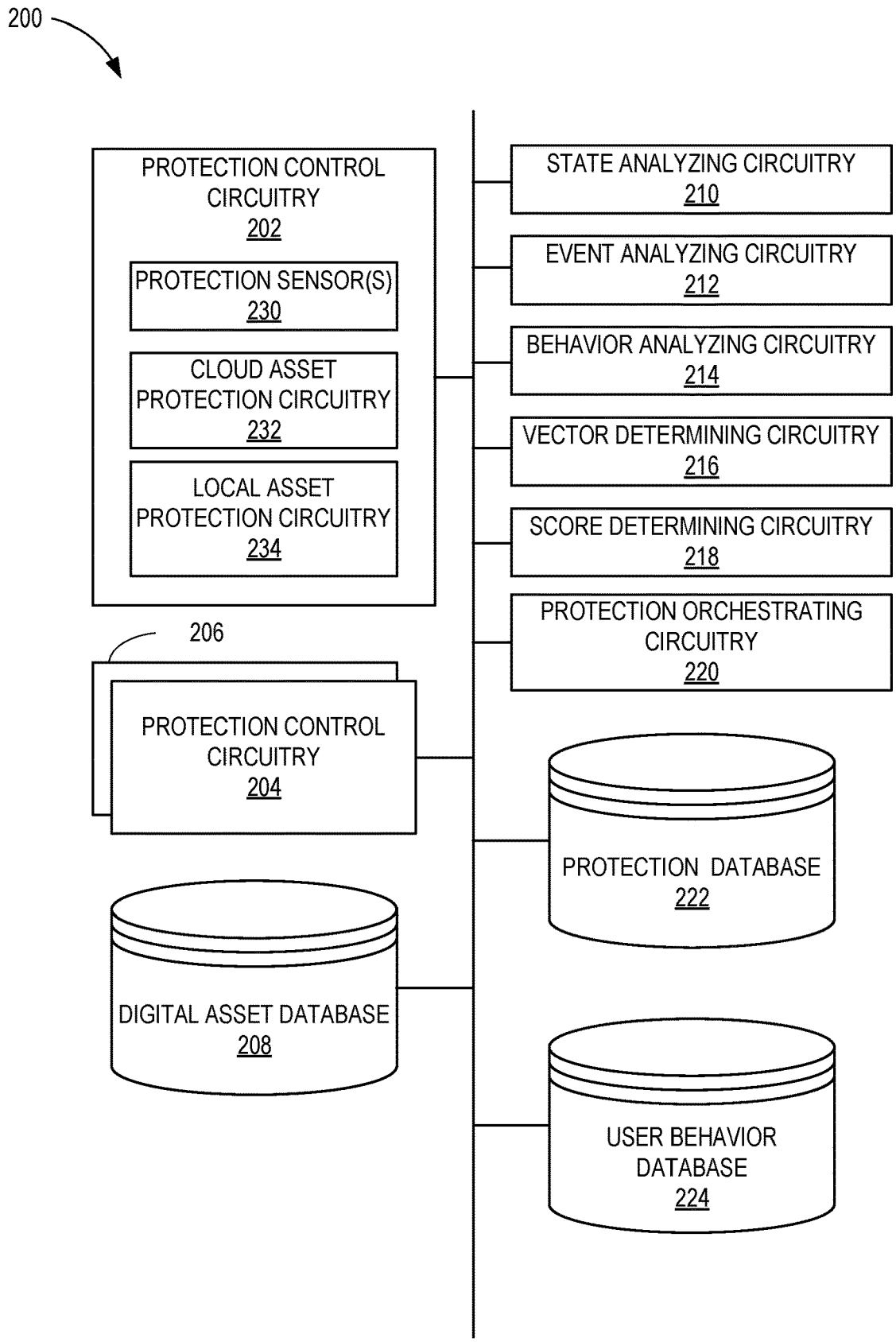
FIG. 2 is a block diagram of example protection circuitry associated with the example networked environment of FIG. 1.

FIG. 2 is a block diagram of the example protection circuitry 130 of FIG. 1. In the illustrated example of FIG. 2, the example protection circuitry 130 includes first example protection control circuitry 202, second example protection control circuitry 204, third example protection control circuitry 206, an example digital asset database 208, example state analyzing circuitry 210, example event analyzing circuitry 212, example behavior analyzing circuitry 214, example vector determining circuitry 216, example score determining circuitry 218, example protection orchestrating circuitry 220, an example protection database 222, and an example user behavior database 224.

The example protection control circuitry 202 controls protection capabilities associated with digital assets of a first user. Example protection capabilities controlled by the example protection control circuitry 202 include various software, hardware, firmware, and/or circuitry components implemented at one or more user devices (e.g., digital asset(s)) associated with the first user (e.g., user devices 112, 114) and/or at a remote server (e.g., the network 102) communicatively coupled to the user device(s) associated with the first user.

A first example protection capability controlled by the example protection control circuitry 202 includes malware scanning software (e.g., antivirus software, etc.) installed in one or more digital assets. For example, the first example protection capability can periodically or intermittently scan the digital asset(s), such as the user device(s) and/or applications and other computer files installed and/or stored in the user device(s), to detect whether malware (e.g., viruses) is present. A second example protection capability controlled by the example protection control circuitry 202 includes a firewall application installed in the digital asset(s) associated with the first user. Specifically, the second example protection capability is configured to filter and/or prevent certain data communications (e.g., filter content from malicious websites, detect and/or block unauthorized access to the user device(s) by a malicious entity, etc.) between the user device(s) and/or the digital assets associated with the user device(s) and a network (e.g., the network 102). A third example protection capability controlled by the example protection control circuitry 202 includes an external threat engine (e.g., a server) that monitors protection information (e.g., online service reputation, software updates for applications installed on a user device, etc.) associated with potential threats to the digital asset(s) associated with the first user. In some examples, the example protection control circuitry 202 performs different types of protection operations, such as discovering the digital asset(s), detecting threats to the digital asset(s), preventing threats to the digital asset(s), and/or correcting threats to the digital asset(s).

In a first example asset discovery operation, the first example protection control circuitry 202 identifies local assets associated with the first user. In this example, the example protection control circuitry 202 scans (e.g., intermittently, periodically, and/or in response to receipt of an input from the first user) the user device(s) associated with the first user to identify local assets, such as applications installed on the user device(s). Accordingly, the user device(s) and the identified applications each correspond to a local asset (e.g., local assets 110) associated with the first user.

In a second example asset discover operation, the first example protection control circuitry 202 identifies cloud assets associated with the first user. In this example, the example protection control circuitry 202 identifies (e.g., by scanning the user device(s), and/or monitoring user activity, etc.) one or more online accounts (e.g., account information used to access online services such as email or e-commerce portals via a network), content (e.g., social media posts, comments, emails, images, videos, etc.), identity data, and/or interaction data associated with the first user. Such identified accounts, content, identity data, and/or interaction data correspond to cloud assets (e.g., cloud assets 120) associated with the first user. In some examples, the cloud assets associated with the first user are associated with more than one user device. Accordingly, the first example protection control circuitry 202 identifies a protection threat surface associated with the first user.

In a first example threat detection operation, the first example protection control circuitry 202 detects a threat associated with one or more local assets of the first user. In this example, the example protection control circuitry 202 identifies one or more applications installed on one or more user devices of the first user that are associated with a given reputation characteristic (e.g., applications having security vulnerabilities, applications associated with a security patch or software update that has not yet been installed, etc.). To facilitate this, in some examples, the protection control circuitry 202 may obtain information from a remote server (e.g., via network 102) about threats and/or vulnerabilities associated with various applications or digital assets.

In a second example threat detection operation, the first protection control circuitry 202 detects a threat associated with one or more cloud assets associated with the first user. In this example, the first protection control circuitry 202 identifies one or more passwords used by the first user to access one or more online accounts. As such, the first protection control circuitry 202 can detect a threat in response to a strength characteristic of the password not satisfying (e.g., being less than) a strength threshold, more than one online account using the same password, and/or a life-span of the password(s) satisfying (e.g., being greater than) a life-span threshold.

Other example threat detection operations include the example protection control circuitry 202 identifying user interactions associated with potential privacy, security, identity, and/or trust threats to one or more digital assets. A non-exhaustive list of example user interactions and/or activities that are potentially associated with such threats includes creating new online accounts, uploading or downloading of files via a network, accessing media via network, using cloud data storage, connecting to a public wireless network, etc.

In a first example threat prevention operation, the example protection control circuitry 202 prevents a threat associated with one or more local assets from affecting the asset(s). For instance, the example protection control circuitry 202 may prevent an application associated with a low reputation characteristic (e.g., security vulnerability, missing software update, association with an entity that exploits sensor data collected by user devices in an unauthorized or an undesirable manner, etc.) from using one or more device sensors (e.g., the device sensors 118) in one or more user devices of the first user. For instance, the first example threat prevention operation may involve allowing the application to run on the user device 112 without accessing device sensors 118 and/or require the application to obtain authorization from the first user to utilize the device sensors 118. By doing so, the protection control circuitry 202 reduces a likelihood that the malicious entity exploits a security vulnerability associated with the application.

In a second example threat prevention operation, the first protection control circuitry 202 prevents a threat associated with one or more cloud assets from affecting the asset(s). For instance, the example protection control circuitry 202 may identify passwords used by the first user that have not been updated for at least a threshold period of time. Such passwords, for instance, may be relatively more vulnerable to various security threats (e.g., use of a breached password by a malicious entity to access other cloud assets that may utilize the same password) compared to passwords that are periodically and/or recently updated by the first user.

In a first example threat correction operation, the first protection control circuitry 202 adjusts a configuration and/or an operation of a local asset associated with an identified threat. For instance, the example protection control circuitry 202 may uninstall, at the user device(s) of the first user, an application(s) associated with a low reputation characteristic and/or another identified threat.

In a second example threat correction operation, the first protection control circuitry 202 adjusts a configuration and/or an operation of a cloud asset associated with an identified threat. For instance, the first protection control circuitry 202 may scan for one or more social media posts submitted by the first user and published by a social media service provider. In turn, the first protection control circuitry 202 can delete the social media post(s) and/or alert the first user that sensitive personal information is being shared in the post in response to a determination that the social media post(s) include information that potentially compromises an identity and/or privacy of the first user (e.g., social security number, driver license, etc.).

FIG. 3 illustrates example protection capabilities (e.g., protection operations) 300 that the first protection control circuitry 202 can utilize to protect the digital assets. In the illustrated example of FIG. 3, the digital assets include local assets 302 (labeled as "DEVICE" in the illustrated example of FIG. 3) and/or cloud assets 304 (labeled as "CLOUD" in the illustrated example of FIG. 3). In FIG. 3, the protection capabilities 300 include a first protection capability (e.g., discovery of digital assets) 306, a second protection capability (e.g., detection of threats) 308, a third protection capability (e.g., prevention of threats) 310, and a fourth protection capability (e.g., correction of threats) 312.

Returning now to the illustrated example of FIG. 2, the first protection control circuitry 202 includes one or more protection sensors (e.g., software sensors, firmware sensors, etc.) 230, cloud asset protection circuitry 232, and local asset protection circuitry 234. In FIG. 2, the protection sensor(s) 230 discover digital assets associated with the first user. For example, the protection sensor(s) 230 can perform periodic scans to detect any new digital assets. In FIG. 2, the protection sensor(s) 230 detects protection events related to a protection posture of the first user. For example, the protection sensor(s) 230 can sense protection events associated with the digital assets, which can be indicative of digital assets and states or configurations associated therewith, external events encountered by the digital assets, and/or user actions performed on the digital assets. Accordingly, the protection sensor(s) 230 can sense threat dimensions associated with the protection threat surface of the first user. To that end, the protection sensor(s) 230 can sense one or more of the threat discovery and/or detection operations described above in association with FIG. 3. In FIG. 2, the protection sensor(s) 230 performs protection telemetry to relay the sensed threat dimensions to other components of the protection circuitry 130.

In FIG. 2, the cloud asset protection circuitry 232 and the local asset protection circuitry 234 perform operations to prevent, correct, and/or mitigate a threat associated with one or more cloud assets and/or local assets associated with the first user. To that end, example operations performed by the cloud asset protection circuitry 232 and/or the local asset protection circuitry 234 include one or more of the threat prevention operations and/or one or more of the threat correction operations described above in association with FIG. 3. In FIG. 2, the cloud asset protection circuitry 232 and the local asset protection circuitry 234 perform protection telemetry to relay the performed operations to other components of the protection circuitry 130.

The example protection control circuitry 204, 206 control protection capabilities for digital assets of other respective users (e.g., a second user and a third user related to the first user). That is, the example protection control circuitry 204 can perform similar functions as those described above for the example protection control circuitry 202 for digital assets associated with the second user. Likewise, the example protection control circuitry 206 can perform similar functions as those described above for the example protection control circuitry 202 for the third user. For example, the first, second, and third users associated, respectively, with protection control circuitry 202, 204, 206 corresponding to a family of users, roommates, and/or any group of connected users. As such, in the illustrated example, the protection threat surface is associated with more than one user.

In some examples, digital interactions of the second user and/or the third user affect the protection posture of the first user. For example, a family member of the first user may utilize the user device(s) associated with the first user to access the Internet and/or other digital asset(s) associated with the first user to perform other tasks. As another example, the first user, the second user, and the third user may be related based on having a shared digital asset (e.g., online access to a shared account, online access to shared media content, etc.). In this example, a threat to the protection posture of the third user (e.g., potential unauthorized access of a shared digital asset) could also affect the protection state and/or posture of one or more digital assets of the first user. Accordingly, in some examples, the example protection circuitry 130 accounts for protection events (e.g., asset detection operations, threat detection operations, threat prevention operations, threat correction operations, etc.) associated with the second protection control circuitry 204 and/or the third protection control circuitry 206 as well when analyzing the protection posture of the first user of the protection control circuitry 202. As such, the first user, the second user, and the third user share the same protection threat surface, which includes all digital assets associated with the first, second, and third users. In some examples, the example protection circuitry 130 aggregates protection efficacy scores (e.g., calculated for each of the first, second, and third users) into a single combined protection efficacy score that characterizes an overall protection posture for the family and/or group of related users.

It is noted that the illustrated example of FIG. 2 shows the first protection control circuitry 202, the second protection control circuitry 204, and the third protection control circuitry 206 only for the sake of example. In some examples, the example protection circuitry 130 includes more or less protection control circuitry for a different number of other users that are related to the first user.

In the illustrated example of FIG. 2, the first, second, and/or third protection control circuitry 202, 204, 206 store an indication of respective digital assets identified thereby in the example digital asset database 208. In some examples, the first, second, and/or third protection control circuitry 202, 204, 206 store one or more other characteristics of the digital assets (e.g., associated user, asset type such as cloud or local asset, etc.) in association with the indication of the digital asset. In various examples, the digital asset database 208 is implemented as any combination of one or more databases (e.g., indexed databases, relational databases, etc.) and/or other types of data structures (e.g., data files, tables, etc.). Further, in some examples, the digital asset database 208 (or a portion thereof) is stored remotely from a user device (e.g., user device 112) and is accessible by the user device via a network (e.g., network 102). In other examples, the digital asset database 208 (or a portion thereof) is stored in one or more user devices (e.g., user devices 112, 114).

In the illustrated example of FIG. 2, the example event analyzing circuitry 212 processes protection events detected by the protection control circuitry 202, 204, 206. For example, the event analyzing circuitry 212 can analyze a state or configuration of the digital asset(s), digital interactions between the user(s) and the digital asset(s), and/or external events encountered by the digital asset(s) (e.g., through a server). In some examples, the example event analyzing circuitry 212 maps a detected protection event to one or more protection vectors and/or one or more digital assets. For example, when a protection event, such as a network connection breach event, is detected, the example event analyzing circuitry 212 can identify one or more digital assets (e.g., user device(s), stored data, etc.) potentially threatened by the protection event. In some examples, the example event analyzing circuitry 212 maps the detected protection event to one or more protection capabilities and/or protection vectors. For example, when a software update is released for a particular application (i.e., the protection event), the example event analyzing circuitry 212 identifies one or more instances of the particular application installed on one or more user devices. In response to determining that the particular application is not updated on the user device(s), the event analyzing circuitry 212 can alert the state analyzing circuitry 210, which can update the protection states associated with the application(s) accordingly. In some examples, the event analyzing circuitry 212 stores detected protection events in the protection database 222.

In the illustrated example of FIG. 2, the example state analyzing circuitry 210 determines protection states of one or more digital assets. For example, the state analyzing circuitry 210 can determine the protection state of the digital asset(s) based on potential threats against the digital asset(s) and/or a configuration of the digital asset(s). By way of example, a first protection state of a local asset such as a user device (e.g., mobile device, desktop computer, etc.) may be based on one or more configuration settings, such as a strength of password used to login to the local asset, an amount of time passed since a virus scan operation was last performed on the local asset, etc. As another example, a second protection state of a cloud asset, such as an e-commerce online portal, may be based on one or more configuration settings, such as a strength of a login password, a reputation of the e-commerce service provider (e.g., whether the service provider has a history of successful hacking events), various user account privacy settings (e.g., whether the user authorized the service provider to share their information with third parties or affiliated entities), online portal security settings (e.g., whether a two-step login authentication setting is enabled), etc.

In some examples, the example state analyzing circuitry 210 determines a protection state of the digital asset(s) based on the identified protection events and/or data collected by the first, second, and third protection control circuitry 202, 204, 206. For example, the state analyzing circuitry 210 can determine the protection state based on a frequency of malware scans performed by the protection sensor(s) 230. When a malware scanning frequency configuration is set to a relatively high frequency (e.g., hourly, daily, etc.), then the example state analyzing circuitry 210 determines a relatively high value (e.g., 100) for a first protection state associated with the digital asset. Alternatively, when the malware scanning frequency configuration is set to a relatively low frequency (e.g., weekly, monthly, etc.), then the example state analyzing circuitry 210 sets the first protection state to a relatively lower value (e.g., 60). In another example, the cloud asset protection circuitry 232 is authorized to manage account settings of an email account of the first user. When the cloud asset protection circuitry 232 successfully enables an advanced login verification setting (e.g., two-step verification, etc.), then the example state analyzing circuitry 210 determines a relatively higher value for a second protection state of the email account (e.g., 70). On the other hand, when the advanced login verification setting is disabled, then the example state analyzing circuitry 210 instead determines a relatively lower value for the second protection state (e.g., 50).

Additionally, the state analyzing circuitry 210 analyzes user digital interactions to determine an impact of such interactions on a protection posture of the protection threat surface. For instance, the state analyzing circuitry 210 determines whether a detected user interaction improves a protection state(s) associated with the digital asset(s) (e.g., enabling a firewall setting, accepting threat remediating suggestion, etc.) or whether the detected the user interaction instead threatens the protection state(s) associated with the digital asset(s) (e.g., new account creation, upload/download of files or other types of content via network, submission of online forms, accessing websites associated with a low reputation characteristic, consumption of online media, user access of online data storage, connection to a public wireless network, etc.). In some examples, the state analyzing circuitry 210 stores the determined protection state(s) in the protection database 222. In some examples, the state analyzing circuitry 210 stores the user digital interactions in the user behavior database 224 along with an impact of the user digital interactions on the protection state(s) associated with the digital asset(s).

In the illustrated example of FIG. 2, the example behavior analyzing circuitry 214 analyzes user digital interactions to determine a relative notional value (e.g., an emotional value, a monetary value, etc.) that the user associates with the respective digital asset(s). For example, the behavior analyzing circuitry 214 can determine the relative emotional value associated with a first digital asset(s) based on a relative usage frequency of the first digital asset compared to other digital assets. Further, the behavior analyzing circuitry 214 can determine the relative monetary value of the first asset based on a value of the first asset compared to the other assets. In some examples, the behavior analyzing circuitry 214 determines a compliance level and/or security awareness of the user(s) based on user responses to messages and/or notifications associated the protection of the digital asset(s). In some examples, the behavior analyzing circuitry 214 determines the relative notional value of the respective digital asset(s) based on the compliance level and/or security awareness of the user(s). In some examples, the behavior analyzing circuitry 214 updates the relative notional value of the respective digital asset(s) dynamically.

Additionally, the behavior analyzing circuitry 214 determines the user device(s) utilized to access the respective digital asset(s). In some examples, the behavior analyzing circuitry 214 determines a time or range of time at which the respective digital asset(s) are typically utilized. In some examples, the behavior analyzing circuitry 214 determines a time or range of time at which the user(s) is more likely to respond to messages and/or notification based on a history of the user responses. In some examples, the behavior analyzing circuitry 214 predicts a user type (e.g., a child, a supervisor, etc.) based on the history of user responses, the digital asset being utilized, and/or content associated therewith.

In the illustrated example of FIG. 2, the example vector determining circuitry 216 determines protection vectors corresponding to the protection capabilities associated with the digital assets. For example, the protection vectors can indicate a state or configuration of the respective protection capabilities associated therewith. As such, the vector determining circuitry 216 can associate each protection vector with a protection capability monitored and/or controlled by the protection control circuitry 202, 204, 206. In some examples, the example vector determining circuitry 216 maps one or more protection vectors to each digital asset associated with the first user, the second user, and/or the third user. In some examples, the vector determining circuitry 216 determines the protection vector of the protection capability associated with the digital assets based on the protection events identified by the event analyzing circuitry 212. In some examples, the example vector determining circuitry 216 determines the protection vectors based on an impact of respective threats addressed by the protection capabilities on the overall protection posture of the protection threat surface.

FIG. 4 illustrates example aspects addressed by the protection vectors (e.g., types of threats) 400 to protect the digital assets. In the illustrated example of FIG. 4, the digital assets include local assets 402 (labeled as "DEVICE" in the illustrated example of FIG. 4) and cloud assets 404 (labeled as "CLOUD" in the illustrated example of FIG. 4). In FIG. 4, the threats 400 include a first threat (e.g., trust exploitation) 406, a second threat (e.g., identity exploitation) 408, a third threat (e.g., privacy exploitation) 410, and a fourth threat (e.g., security exploitation) 412.

In some examples, the example vector determining circuitry 216 assigns weights to the respective protection vectors corresponding to an impact of the associated protection capability on the overall protection posture of the protection threat surface. For example, the vector determining circuitry 216 can determine weights indicative of an impact of a protection vector with respect to a protection posture of the associated user(s). For example, the weights can be categorical (e.g., low, high, critical, etc.) or numerical (e.g., 30, 60, 100, etc.). In some examples, the vector determining circuitry 216 determines weights that correspond to the protection state of the respective digital asset. For example, the vector determining circuitry 216 can determine weights that indicate whether protection capabilities are enabled, such as discovery of digital asset(s), detection of protection events associated with the digital asset(s), control of the digital asset(s), and/or detection of user behavior.

In FIG. 2, the vector determining circuitry 216 determines, for each protection vector mapped to a respective protection capability, a value indicative of an asset type (e.g., cloud asset, digital asset) of the respective digital asset, a protection capability, one or more aspects of protection associated with the protection capability (e.g., asset discovery, protection event detection, a configuration of protection control to provide threat prevention and/or threat correction, etc.), one or more protection event classifications and/or threat dimensions associated with the protection vector (e.g., security, privacy, identity, trust, etc.), associated user behavior (e.g., expected and/or detected user responses to previous notifications, actions, and/or attempts), and an impact weight. For example, the vector determining circuitry 216 can record a first value in the protection vector indicative of the associated asset type, a second value indicative of a protection aspect that the associated protection capability provides, a third value indicative of a configuration of the protection capability (e.g., enabled or disabled), a fourth value indicative of the protection event classification, a fifth value indicative of the user behavior associated with the digital asset, and/or a sixth value indicative of the impact weight of the protection vector on the overall protection posture of the protection threat surface associated with the users. In some examples, the vector determining circuitry 216 determines multiple different weights within each vector. For example, each protection vector may include separate weights to indicate respective impacts of an underlying protection capability on the security, privacy, identity, and/or trust of a user.

Figure 5:
FIG. 5 illustrates example protection parameters and example weights associated therewith in example protection vectors determined by the example protection circuitry of FIG. 2.

FIG. 5 illustrates a non-exhaustive list of protection capabilities 502 and example weights 504 associated with example protection vectors 500, in accordance with teachings of this disclosure. In the illustrated example of FIG. 5, a first protection vector 506 is associated with whether a password breach notification is enabled. In FIG. 5, a second protection vector 508 is associated with whether all the passwords utilized by the user are categorized as strong based on a complexity thereof (e.g., a number of characters, types of characters, etc.). In FIG. 5, a third protection vector 510 is associated with whether an operating system of a digital asset has up-to-date security. In FIG. 5, a fourth protection vector 512 is associated with whether all passwords that the user(s) utilizes are unique. In FIG. 5, a fifth protection vector 514 is associated with whether side-loading on an operating system is enabled. In FIG. 5, a sixth protection vector 516 is associated with whether a file system has been scanned in the last 24 hours. In FIG. 5, a seventh protection vector 518 is associated with whether a user(s) is protected from visiting unsafe sites. In FIG. 5, an eighth protection vector 520 is associated with whether a user(s) has any password that are more than a threshold amount of time (e.g., 90 days) old. In FIG. 5, a ninth protection vector 522 is associated with whether a "find my device" feature is enabled. In FIG. 5, a tenth protection vector 524 is associated with whether a firewall is enabled. In FIG. 5, an eleventh protection vector 526 is associated with whether a recovery process for lost identity assets is triggered when a breach event occurs. In FIG. 5, a twelfth protection vector 528 is associated with whether VPN is utilized for sensitive online activities, such as online interactions. In FIG. 5, a thirteenth protection vector 530 is associated with whether passwords are changed frequently. In FIG. 5, a fourteenth protection vector 532 is associated with whether all data storage services have a good reputation with respect to privacy and security. In FIG. 5, a fifteenth protection vector 534 is associated with whether a Domain Name System (DNS) privacy is being protected via DoT or DoH. In FIG. 5, a sixteenth protection vector 536 is associated with whether a digital asset is being protected by a strong password, biometric authentication, and/or pin. In FIG. 5, a seventeenth protection vector 538 is associated with whether a digital asset is frequently locked and safe. In FIG. 5, an eighteenth protection vector 540 is associated with whether services are enabled to identify a user(s) through browser fingerprinting techniques. In FIG. 5, a nineteenth protection vector 542 is associated with whether all installed applications have a high reputation. In FIG. 5, a twentieth protection vector 544 is associated with whether all browser extensions have a high reputation. In FIG. 5, a twenty-first protection vector 546 is associated with whether all social media accounts associated with the user(s) are discoverable. In FIG. 5, a twenty-second protection vector 548 is associated with whether social media configuration are appropriate for a desired privacy level associated with the user(s). In FIG. 5, a twenty-third protection vector 550 is associated with whether account settings are configured for optimal privacy and security.

In FIG. 5, the weights 504 represent a relative impact of each protection capability 502 with respect to the overall protection posture of the protection threat surface. For the sake of example, the example values of the weights 504 are normalized to values between 0 and 100. In some examples, the relative impact of the protection capabilities 502 is dynamic and, in turn, the weights 504 are correspondingly dynamic. Additionally, a first weight of the first protection vector 506 can be adjusted to a lower value than 100 if the eighth protection vector 520 is not satisfied.

Returning to the illustrated example of FIG. 2, the vector determining circuitry 216 can assign different weight values to different assigned instances of the same protection vector. For instance, the weight value of 100 shown in FIG. 5 could be assigned to the first protection vector when mapped to cloud assets (e.g., online accounts), and a different weight value (e.g., 90) could instead be assigned to the first protection vector when mapped to local assets (e.g., operating systems). Alternatively, in some examples, a same impact weight value can be assigned to a particular protection vector when mapped to any digital asset.

In some examples, the example vector determining circuitry 216 maps the first protection vector to one or more digital assets, such as one or more online accounts of the user (e.g., cloud assets) and/or one or more operating systems of user devices (e.g., local assets) of the user. Additionally or alternatively, the vector determining circuitry 216 can map a second protection vector to a single digital asset.

Figure 6:
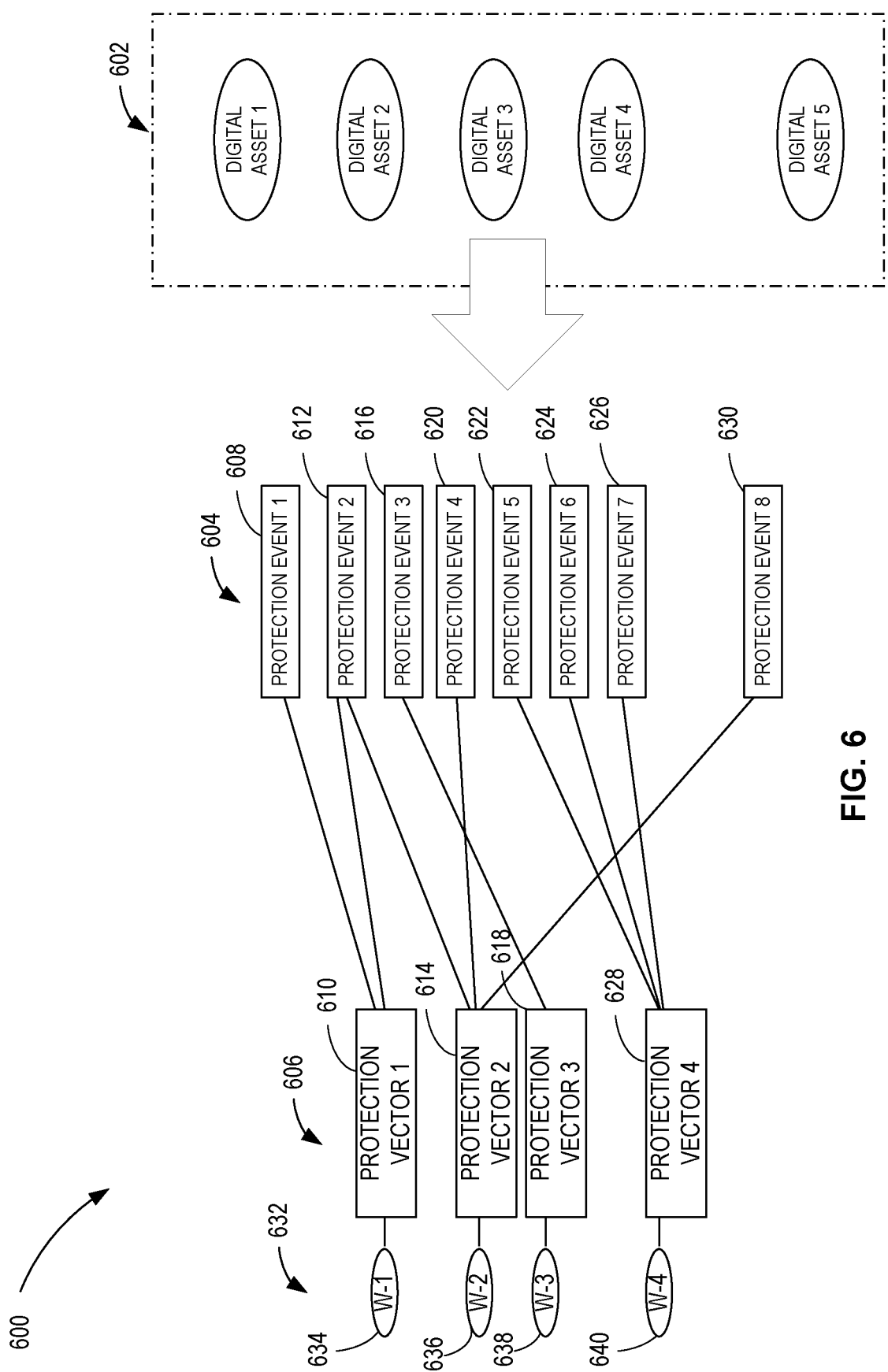
FIG. 6 illustrates example protection events encountered by the example local digital assets and the example cloud digital assets of FIG. 1 and mapped to example protection vectors determined by the protection circuitry of FIG. 2.

FIG. 6 illustrates example hierarchical relationships 600 between digital assets 602, protection events 604, and protection vectors 606, in accordance with teachings of this disclosure. In the illustrated example of FIG. 6, the digital assets 602 produce the protection events 604 based on a configuration associated therewith and/or in response to encountering user actions and/or external events. In some examples, the digital assets 602 produce one or more of the protection events 604, respectively. In some examples, a first protection event 608 is produced by more than one of the digital assets 602.

In the illustrated example of FIG. 6, one or more of the protection events 604 are mapped to one or more of the protection vectors 606. That is, the protection events 604 affect one or more of the protection vectors 606. Thus, in some examples, the hierarchical relationships 600 between protection vectors and protection events may correspond to a many-to-many relationship. In FIG. 6, the first protection event 608 is mapped to a first protection vector 610. In FIG. 6, a second protection event 612 is mapped to the first protection vector 610 and a second protection vector 614. In FIG. 6, a third protection event 616 is mapped to a third protection vector 618. In FIG. 6, a fourth protection event 620 is mapped to the second protection vector 614. In FIG. 6, a fifth protection event 622, a sixth protection event 624, and a seventh protection event 626 are mapped to a fourth protection vector 628. In FIG. 6, an eighth protection event 630 is mapped to the second protection vector 614.

In the illustrated example of FIG. 6, the protection vectors 606 are associated with impact weights 632 based on an impact of the protection vector 606 on the overall protection posture of the digital assets 602 (e.g., the protection threat surface). In FIG. 6, the first protection vector 610 is associated with a first impact weight 634, the second protection vector 614 is associated with a second impact weight 636, the third protection vector 618 is associated with a third impact weight 638, and the fourth protection vector 628 is associated with a fourth impact weight 640.

Returning to the illustrated example of FIG. 2, the example score determining circuitry 218 determines a protection score (e.g., a protection efficacy score) for the protection threat surface. The protection score corresponds to the overall protection posture of the users. That is, the protection score indicates an extent to which the users are protected against potential threats to the digital assets. In one example, the example score determining circuitry 218 calculates the protection score as a ratio of an acquired score and a maximum possible score, as shown by equation [1] below.

$$\text{Protection Score} = \frac{\text{Acquired Score}}{\text{Maximum score}} * M_s \qquad [1]$$

In equation [1], the acquired score may correspond to a weighted sum of protection vectors mapped across all digital assets of the users. However, it should be understood that the score determining circuitry 218 may aggregate the protection vectors in any other way, such as averaging the protection vectors, to obtain the acquired score.

In equation [1], the maximum score corresponds to a maximum obtainable value for the acquired score (e.g., if protection capabilities associated with all protection vectors are optimal).

In equation [1], $M_s$ corresponds to a multiplier or scale factor applied to the result of the ratio (acquired score/maximum score). For example, if $M_s$ has a value of 1000, then the result of the ratio would be scaled up from a value between 0 and 1 to a value between 0 and 1000. Other values of $M_s$ are possible as well.

Equation [2] shows an example weighted sum calculation for the "Acquired Score" of equation [1].

$$\text{Acquired Score} = \Sigma_{i<1}^{i=n} v_{i*}$$

$$\Sigma_{j=1}^{j=m} f(\text{state}_{ij}, \text{control}_{ij}, \text{behavior}_{ij}, \text{ws}_{ij}, \text{wc}_{ij}, \text{wb}_{ij}) \qquad [2]$$

In equation [2], the first user has n digital assets and protection capabilities associated with each asset are mapped to up to m protection vectors.

In equation [2], $v_i$ corresponds to a notional value weight associated with each digital asset according to a personalized emotional and/or monetary value of that particular asset. For example, the behavior analyzing circuitry 214 can determine the notional value weight of the digital assets associated with the respective protection vectors based on user behaviors associated with the digital assets. In one example, $v_i$ can be selected as a value between 1.0 and 1.9. For instance, a higher value of $v_i$ can be used for first digital asset and a lower value of $v_i$ can be used for a second different digital asset when the behavior analyzing circuitry determines the second digital asset has a lower notional value to the first user relative to the first digital asset.

f (state$_{ij}$, control$_{ij}$, behavior$_{ij}$, ws$_{ij}$, wc$_{ij}$, wb$_{ij}$) in equation [2] is a function (e.g., mathematical calculation, etc.) that computes a vector score for each protection vector j of asset i based on the values of state$_{ij}$, control$_{ij}$, behavior$_{ij}$, ws$_{ij}$, wc$_{ij}$, wb$_{ij}$. In some examples, the function f returns a sum of one or more of the weights ws$_{ij}$, wc$_{ij}$, wb$_{ij}$ that are activated for the vector j and/or the asset i. In some examples, the function f returns an average of one or more of the weights ws$_{ij}$, wc$_{ij}$, wb$_{ij}$ that are activated for the vector j and/or the asset i.

In some examples, state$_{ij}$ is a switch that activates weight factor ws$_{ij}$ when a protection capability associated with a protection vector j can be utilized for asset discovery and/or threat detection with respect to a digital asset i. For example, the score determining circuitry 218 can activate state$_{ij}$ (e.g., assign a value of 1 to state$_{ij}$) in response to the protection vector j being utilized to determine a protection state of the digital asset i. On the other hand, the score determining circuitry 218 can deactivate state$_{ij}$ (e.g., assign a value of 0 to state$_{ij}$) in response to the protection vector j not being utilized to determine the protection state associated with the digital asset. In some examples, the score determining circuitry 218 assigns a value of 1 to state$_{ij}$ to utilize or activate ws$_{ij}$ and assigns a value of 0 to state$_{ij}$ to deactivate ws$_{ij}$. Similarly, the score determining circuitry 218 can set control$_{ij}$ as a switch to activate weight wc$_{ij}$ in response to the protection vector j being utilized to control a protection capability associated with the digital asset i (e.g., in response to the protection capability associated with the protection vector j corresponding to threat prevention and/or threat correction operations). Likewise, the score determining circuitry 218 can set behavior$_{ij}$ as a switch to activate weight wb$_{ij}$ in response to the protection vector j being utilized to monitor user behaviors associated with the digital asset i (e.g., in response to user behavior monitoring being enabled for the underlying protection capability associated with protection vector j).

Similarly, control$_{ij}$ is a switch that activates weight wc$_{ij}$ if protection vector j can be used for controlling a protection state of asset i.

Similarly, behavior$_{ij}$ is a switch that activates weight wb$_{ij}$ if protection vector j is associated with user behavior.

In equation [2], the weights ws$_{ij}$, wc$_{ij}$, wb$_{ij}$ are values that indicate an impact of vector j on security, privacy, identity, and/or trust threats associated with asset i. In some examples, the values of ws$_{ij}$, wc$_{ij}$, wb$_{ij}$ can be selected from a range of values between 0 and 100. For example, ws$_{ij}$ can have a value of 0 if protection vector j (when activated) has no impact on the security of asset i, a value of 30 if the impact of vector j (when activated) is medium, a value of 60 if the impact is high, or a value of 100 if the impact is critical. In alternative examples, the weights ws$_{ij}$, wc$_{ij}$, wb$_{ij}$ can have different values and/or be selected from within different ranges of values.

In the illustrated example of FIG. 2, the score determining circuitry 218 stores the protection efficacy score via the protection database 222. In FIG. 2, the score determining circuitry 218 presents the protection efficacy score to one or more of the digital assets associated with the user(s). In some examples, the cloud asset protection circuitry 232 and/or the local asset protection circuitry 234 present the protection efficacy score to one or more of the digital assets associated with the user(s).

Figure 7:
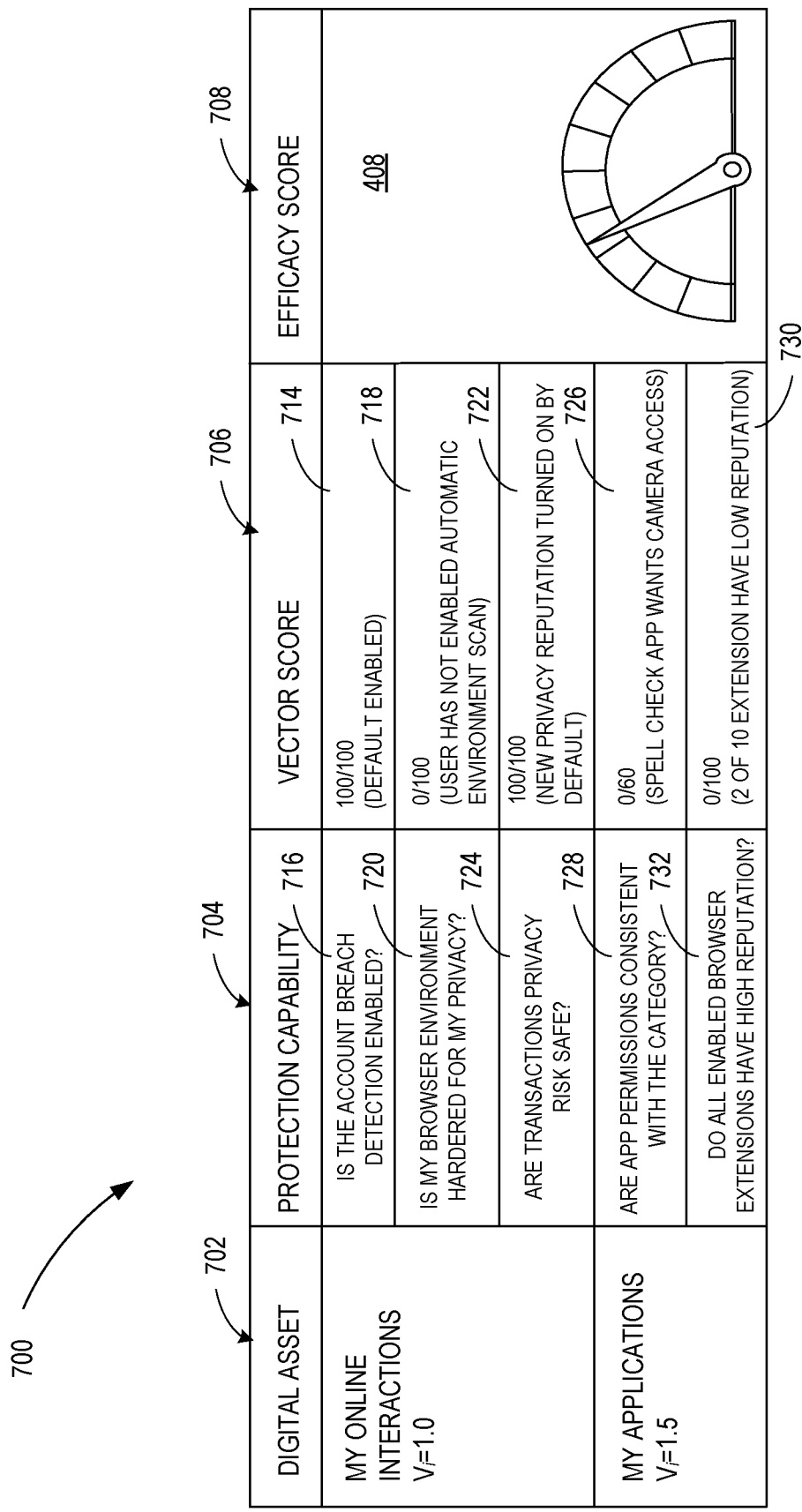
FIG. 7 illustrates an example protection efficacy score computation performed by the example protection circuitry of FIG. 2.

FIG. 7 illustrates an example score computation 700, in accordance with teachings of this disclosure. The example score computation 700 includes digital assets 702, protection capabilities 704 associated with the digital assets 702, protection vector scores 706 associated with the protection capabilities 704, and an efficacy score 708 indicative of the overall protection posture of the user(s).

In the illustrated example of FIG. 7, the behavior analyzing circuitry 214 determines different notional values ($v_i$) to assign to the digital assets 702 based on behaviors of the user(s) associated with the respective digital assets 702. In FIG. 7, the behavior analyzing circuitry 214 associates a first notional value (e.g., $v_i$=1.0) with a first digital asset ("MY ONLINE INTERACTIONS") 710. In FIG. 7, the behavior analyzing circuitry 214 associates a second notional value (e.g., $v_i$=1.5) with a second digital asset ("MY APPLICATIONS") 712.

In the illustrated example of FIG. 7, the vector determining circuitry 216 determines a first protection vector score 714 for a first protection capability 716 in response to the user(s) enabling a default setting. In FIG. 7, the vector determining circuitry 216 determines a second protection vector score 718 for a second protection capability 720 in response to the user(s) not enabling automatic environment scanning. In FIG. 7, the vector determining circuitry 216 determines a third protection vector score 722 for a third protection capability 724 in response to a new privacy reputation being activated via default settings. In FIG. 7, the vector determining circuitry 216 determines a fourth protection vector score 726 for a fourth protection capability 728 in response to an application attempting to obtain access to a camera. In FIG. 7, the vector determining circuitry 216 determines a fifth protection vector score 730 for a fifth protection capability 732 in response to a portion of all enabled browser extensions having a low reputation. In FIG. 7, the score determining circuitry 218 utilizes equation [1] with the protection vector scores 706 and the notional values associated with the digital assets 702 to determine the efficacy score 708, which has value of 408 in this example.

Figure 8:
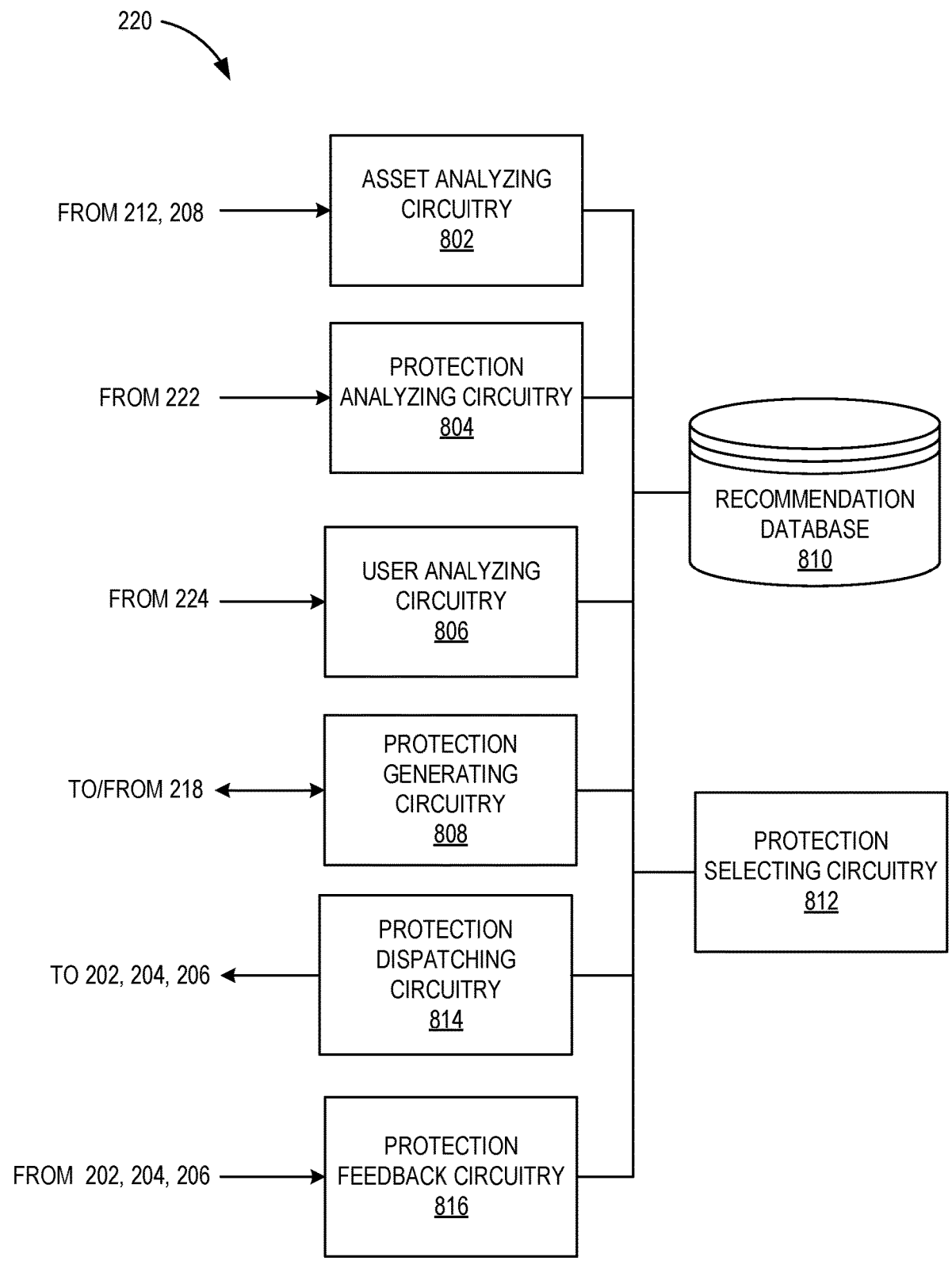
FIG. 8 is a block diagram of example protection orchestrating circuitry of the protection circuitry of FIG. 2.

Returning now to the illustrated example of FIG. 2, the example threat remediating circuitry 220 generates one or more protection remediating actions (e.g., a recommendation, an authorized automated action, etc.) to improve a protection posture of the user(s), as discussed further in association with FIG. 8. In some examples, the protection orchestrating circuitry 220 determines the protection remediating action(s) based on the protection telemetry performed by the protection control circuitry 202, 204, 206. In some example, the protection orchestrating circuitry 220 determines the protection remediating action(s) based on a state(s) of the digital asset(s) determined by the state analyzing circuitry 210. In some examples, the protection orchestrating circuitry 220 determines the protection remediating action(s) based on a protection vector(s) determined by the vector determining circuitry 216. In some examples, the protection orchestrating circuitry 220 determines the protection remediating action(s) based on behaviors of the user(s) determined by the behavior analyzing circuitry 214.

In some examples, the behavior analyzing circuitry 214 determines the particular digital asset to which the message and/or notification should be provided based on a relative frequency of an execution of the protection remediating actions when using said particular digital asset. Additionally or alternatively, the behavior analyzing circuitry 214 can determine when to provide messages and/or notifications to the respective digital asset(s) based on when the respective digital asset(s) is typically utilized.

A non-exhaustive list of example protection remediating actions that the example protection orchestrating circuitry 220 can determine and/or trigger includes outputting a notification message, outputting a recommendation message to the user(s) (e.g., suggestion that the user(s) should change a password, enable a feature, install a software update, etc.), outputting instructions that cause a protection agent (e.g., cloud asset protection agent 232, local asset protection agent 234) to adjust a protection state of a digital asset (e.g., outputting instructions for an anti-virus application on a particular user device to start a background scan operation).

In the illustrated example of FIG. 2, the example protection database 222 stores an indication of the protection vectors determined by the example vector determining circuitry 216. In some examples, the example protection database 222 stores an indication of historical protection states determined by the state analyzing circuitry 210. In some examples, the example protection database stores an indication of the protection events detected by the event analyzing circuitry 212. The example protection database 222 can be implemented similarly to the digital asset database 208 (e.g., as an indexed database, relational database, and/or any other data structure), and the protection database 222 or a portion thereof can be stored locally at one or more user devices and/or remotely at one or more remote servers.

In the illustrated example of FIG. 2, the user behavior database 224 stores user behaviors associated with the digital assets. For example, the user behavior database 224 can store the user behaviors identified by the behavior analyzing circuitry 214. The example user behavior database 224 can be implemented similarly to the digital asset database 208 and the protection database 222 (e.g., as an indexed database, relational database, and/or any other data structure), and the user behavior database 224 or a portion thereof can be stored locally at one or more user devices and/or remotely at one or more remote servers.

FIG. 8 is a block diagram representative of the protection orchestrating circuitry 220. In the illustrated example of FIG. 8, the protection orchestrating circuitry 220 includes example asset analyzing circuitry 802, example protection analyzing circuitry 804, example user analyzing circuitry 806, example protection generating circuitry 808, an example recommendation database 810, example protection selecting circuitry 812, and example protection dispatching circuitry 814.

In the illustrated example of FIG. 8, the asset analyzing circuitry 802 identifies a digital asset associated with a protection event in response to digital assets encountering protection events. For example, the asset analyzing circuitry 802 can obtain a signal indicative of the protection event via the event analyzing circuitry. In some examples, the asset analyzing circuitry 802 determines characteristics associated with the protection event, such as a type of protection event, a digital asset associated with the protection event, and/or a user device associated with the digital asset when the digital asset itself is not the user device. In some examples, the asset analyzing circuitry 802 extracts information corresponding to the digital asset associated with the protection event, such as a type of the digital asset (e.g., user device, local data, user account data, etc.) and/or protection capabilities associated with the digital asset, via the digital asset database 208. In some examples, the asset analyzing circuitry 802 transmits a signal indicative of the protection event and the digital asset associated therewith to the protection analyzing circuitry 804, the user analyzing circuitry 806, and/or the protection generating circuitry 808, In the illustrated example of FIG. 8, the protection analyzing circuitry 804 analyzes a protection state and/or one or more protection vectors associated with the digital asset in response to the protection event occurring. For example, the protection analyzing circuitry 804 can obtain the digital asset associated with the protection event via the asset analyzing circuitry 802. Further, the protection analyzing circuitry 804 can access the protection state and/or the protection vector(s) via the protection database 222. Accordingly, the protection analyzing circuitry 804 can identify the protection vector(s) impacted in response to the protection event occurring. In some examples, the protection analyzing circuitry 804 determines a trend associated with the protection vector(s) and/or the overall protection efficacy score for the user(s). In some examples, the protection analyzing circuitry 804 transmits a signal indicative of the protection vector(s) associated with the protection event, the trend associated with the protection vector(s), and/or the trend associated with the overall protection efficacy score to the protection generating circuitry 808.

In the illustrated example of FIG. 8, the user analyzing circuitry 806 analyzes user context associated with the protection event. For example, the user analyzing circuitry 806 can obtain the digital asset associated with the protection event via the asset analyzing circuitry 802. In turn, the user analyzing circuitry 806 can identify user behaviors associated with the digital asset via the user behavior database 224. As such, the user analyzing circuitry 806 can determine a security awareness of the user, a compliance level of the user (e.g., a frequency according to which the user acts in response to receiving a protection recommendation), and/or a notional value of the digital asset associated with the protection event. In some examples, the user analyzing circuitry 806 transmits the user context associated with the protection event to the protection generating circuitry 808, the protection selecting circuitry 812, and/or the protection dispatching circuitry 814.

In the illustrated example of FIG. 8, the protection generating circuitry 808 generates one or more protection remediation actions (e.g., protection recommendations, protection automation, etc.) in response to the digital assets encountering the protection event. For example, the protection generating circuitry 808 can determine the protection remediation action(s) based on the protection event and the associated digital asset obtained via the asset analyzing circuitry 802, the protection vector(s) associated with the protection event, the trend associated with the protection vector(s), and/or the trend associated with the overall protection efficacy score obtained via the protection analyzing circuitry 804, and/or the user context obtained via the user analyzing circuitry 806.

In the illustrated example of FIG. 8, the protection generating circuitry 808 determines an impact of potential protection remediation actions on the protection efficacy score associated with the protection threat surface. For example, the protection generating circuitry 808 can adjust the protection vector(s) associated with the protection event to correspond to a result of the potential protection remediation action being implemented. In turn, the protection generating circuitry 808 can transmit the resulting protection vector(s) to the score determining circuitry 218, which calculates the protection efficacy score that would result from the protection remediation action being implemented. Accordingly, the protection generating circuitry 808 can determine an improvement to the protection efficacy score based on the current protection efficacy score and the protection efficacy score that results from the implementation of the protection remediation action. That is, the protection generating circuitry 808 compares a first protection efficacy score associated with the current protection vectors to a second protection efficacy score associated with the updated protection vectors to determine the improvement to the protection efficacy score. In some examples, the protection generating circuitry 808 determines the impact of the potential protection remediation actions based on impact weights of the associated protection vectors.

In the illustrated example of FIG. 8, the protection generating circuitry 808 can determine other information associated with the protection remediation actions, such as a remediating action type (e.g., advice, content, protection automation action, etc.), remediating action content (e.g., a message, a URL link, a protection intent), a destination protection agent (e.g., device(s), application(s), API(s), plugin(s), and/or any other relevant protection agent for enforcing the given protection recommendation), a user context (e.g., displayable message, background operation, time or time range for enforcing the given protection recommendation, etc.), and/or a remediating action priority. In the illustrated example of FIG. 8, the example protection generating circuitry 808 sorts the information associated with the protection remediation action using the following data structure (e.g., n-tuple):

```
{Remediating action Type: [Advice | Content |
Protection Automation],
Remediating action content : [Message | URL |
Protection Intent],
Destination Protection Agent: [Device_ID1,
DeviceID2],
User Context: [Display Context, Display Time Range],
Remediating action Priority: [High | Medium | Low],
Protection Score Improvement: [number]
}
```

In the illustrated example of FIG. 8, the recommendation database 810 stores pre-conditions that link protection events with respective protection recommendations. In FIG. 8, the protection generating circuitry 808 compares the encountered protection event to pre-conditions associated with the protection remediation actions stored in the recommendation database 810. For example, the protection generating circuitry 808 can determine a recommendation to change a password and/or a username for an account is to be generated in response to a pre-condition being satisfied, such as an account breach containing the password and/or the username occurring, an age of the password satisfying an age threshold (e.g., exceeding a recommended limit), determining the password is not strong, and/or determining the password is not unique across other accounts associated with the user.

In the illustrated example of FIG. 8, the protection generating circuitry 808 identifies and generates the protection remediation actions based on a rule-based model or a machine learning-based model. For example, when utilizing the rule-based model, the protection generating circuitry 808 can identify a remediating action or a component of the remediating action (e.g., a remediating action type, a remediating action priority, etc.) based on the protection event and the impact of the protection event on the associated protection vector(s) and/or the overall protection efficacy score. In some examples, the protection generating circuitry 808 generates a protection remediation action in response to a corresponding protection efficacy score improvement satisfying (e.g., surpassing) a threshold score improvement. Accordingly, the protection generating circuitry 808 avoids generating protection remediation actions with minimal impact to the protection associated with the digital assets of the user(s) to save processing resources and improve an overall user experience. To account for more complex effects of the protection vector(s) on the overall protection efficacy score, the protection generating circuitry 808 can utilize the machine learning-based model to process the protection events, the digital assets, associated user behaviors, an impact of the protection events on the protection vectors or the overall protection efficacy score. For example, when the protection events impact various protection vectors to different degrees, the protection generating circuitry 808 can utilize the machine learning-based model to optimize the protection remediation actions being generated. In FIG. 8, the protection generating circuitry 808 transmits a signal indicative of the generated protection remediation actions to the protection selecting circuitry 812.

To prevent a user experience from being negatively impacted by frequent and/or unorganized protection remediation actions, the protection selecting circuitry 812 groups and prioritizes the generated protection remediation actions. In FIG. 8, the protection selecting circuitry 812 groups the generated protection remediation actions based on the associated digital asset, asset type, and/or user device utilized to access the digital asset. In FIG. 8, the protection selecting circuitry 812 prioritizes the generated protection remediation actions based on the protection vector(s) (e.g., an impact weight associated with the protection vectors, a value change in the protection vector(s), etc.), information associated with the digital asset (e.g., an asset value, an asset type, an asset access device, etc.), and/or information associated with the user(s) (e.g., user awareness level, user context, etc.).

In some examples, the protection selecting circuitry 812 rate the generated protection remediation actions based on an impact of the protection remediation action on the overall protection efficacy score and/or a notional value associated with the respective digital asset associated with the protection event. In some examples, the protection selecting circuitry 812 selects a protection remediation action from a chain of related protection remediation actions in response to the protection remediation action being associated with the highest increase in the overall protection efficacy score. In some examples, the protection selecting circuitry 812 prioritizes certain protection remediation actions, such as protection recommendations, over other protection remediation actions, such as advice or multimedia. In some examples, the protection selecting circuitry 812 rates the generated protection actions associated with certain asset types, such as financial accounts and/or user devices, higher than the protection actions associated with other asset types. In some examples, the protection selecting circuitry 812 prioritizes the digital assets associated with a reduced protection state. In some examples, the protection selecting circuitry 812 assigns a same priority to the digital assets that are accessed via a same user device. In some examples, the protection selecting circuitry 812 provides more recommendations to a user(s) that has a higher level of awareness and readily implements protection associated with received protection recommendations and/or advice. In some examples, the protection selecting circuitry 812 prioritizes the protection remediation actions associated with digital assets that the user(s) typically readily engage with recommendations for, which enables the protection remediation actions to be implemented faster. In FIG. 8, the protection selecting circuitry 812 transmits a signal indicative of the selected protection remediation actions and the groups and ratings associated therewith to the protection dispatching circuitry 814.

In the illustrated example of FIG. 8, the protection dispatching circuitry 814 dispatches the protection remediation actions based on the ratings associated therewith. In some examples, the protection dispatching circuitry 814 identifies the user device to which a protection recommendation and/or advice is to be transmitted based on the user device that the user frequently utilizes. For examples, the user device that the user frequently utilizes can be the user device most frequently utilized or the user device most frequently utilized to access the digital asset associated with the recommendation and/or advice. For example, certain digital assets may only be accessed through certain user devices. In some examples, the protection dispatching circuitry 814 identifies the user device and/or a time to provide the recommendation and/or advice based on a user type (e.g., whether the user is a child or an adult, an awareness level associated with the user(s), other user context, etc.) and activity patterns associated with the user(s) (e.g., a time frame according to which the user(s) typically utilizes certain user devices). For example, the protection dispatching circuitry 814 can determine that a parent typically utilizes a family laptop in the evening on weekdays and, in turn, provide protection recommendations and/or advice to the device during those time frames. In some examples, the protection dispatching circuitry 814 identifies the user device to which the protection recommendation is to be transmitted based on protection capabilities associated with the user device. For example, a protection capability associated with the protection recommendation and/or advice may only be available on certain user devices. In FIG. 8, the protection dispatching circuitry 814 transmits a signal indicative of the protection remediation action, the user device associated with the protection remediation action, the time of day to surface the protection remediation action, and the priority level of the protection remediation action to the protection control circuitry 202, 204, 206, which can implement the protection remediation action accordingly.

In the illustrated example of FIG. 8, the protection feedback circuitry 816 determines whether the user(s) allowed the protection remediation action to be implemented. In FIG. 8, the protection feedback circuitry 816 determines whether the protection remediation action has been implemented based on activity associated with the protection control circuitry 202, 204, 206. For example, the protection feedback circuitry 816 can determine that a protection recommendation was sent to a user device but the user did not perform the recommended action or enable the recommended action to be performed in response to receiving the protection recommendation. In some examples, the protection feedback circuitry 816 determines the protection recommendation was not implemented in response to a user action (e.g., user selecting "ignore" when asked to implement protection remediation) and/or in response to a threshold amount of time passing between the protection recommendation being transmitted to the user device. In some examples, the protection feedback circuitry 816 causes the protection dispatching circuitry 814 to dispatch the impact of the protection remediation action. For example, the protection dispatching circuitry 814 can present the impact of the protection remediation action as an improvement to the overall protection efficacy score.

In some examples, the protection orchestrating circuitry 202 includes means for monitoring digital assets associated with a protection threat surface. For example, the means for monitoring the digital assets may be implemented by asset analyzing circuitry 802. In some examples, the asset analyzing circuitry 802 may be implemented by machine executable instructions such as that implemented by at least blocks 1002, 1004 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the asset analyzing circuitry 802 is implemented by other hardware logic circuitry, hardware implemented state machines, and/or any other combination of hardware, software, and/or firmware. For example, the asset analyzing circuitry 802 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the protection orchestrating circuitry 202 includes means for determining one or more protection vectors associated with the digital assets in response to detecting a protection event, the protection vectors including one or more values corresponding to an impact of the protection event on an overall protection posture associated with the protection threat surface. For example, the means for determining protection vectors associated with the digital assets may be implemented by protection analyzing circuitry 804. In some examples, the protection analyzing circuitry 804 may be implemented by machine executable instructions such as that implemented by at least block 1006 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the protection analyzing circuitry 804 is implemented by other hardware logic circuitry, hardware implemented state machines, and/or any other combination of hardware, software, and/or firmware. For example, the protection analyzing circuitry 804 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the protection orchestrating circuitry 202 includes means for determining a protection remediation action for the digital assets based on the protection vectors. For example, the means for determining the protection remediation action may be implemented by protection generating circuitry 808. In some examples, the protection generating circuitry 808 may be implemented by machine executable instructions such as that implemented by at least block 1006 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the protection generating circuitry 808 is implemented by other hardware logic circuitry, hardware implemented state machines, and/or any other combination of hardware, software, and/or firmware. For example, the protection generating circuitry 808 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the protection orchestrating circuitry 202 includes means for determining a priority of the determined protection remediation action based on the impact of the determined protection remediation action on the overall protection posture. For example, the means for determining the priority of the determined protection remediation actions may be implemented by protection selecting circuitry 812. In some examples, the protection selecting circuitry 812 may be implemented by machine executable instructions such as that implemented by at least block 1018 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the protection selecting circuitry 812 is implemented by other hardware logic circuitry, hardware implemented state machines, and/or any other combination of hardware, software, and/or firmware. For example, the protection selecting circuitry 812 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the protection orchestrating circuitry 202 includes means for causing the improvement to the overall protection efficacy score to be dispatched to one or more user devices associated with the protection threat surface in response to the protection remediation action not being executed. For example, the means for causing the improvement to the overall protection efficacy score to be dispatched may be implemented by protection feedback circuitry 816. In some examples, the protection feedback circuitry 816 may be implemented by machine executable instructions such as that implemented by at least block 1024 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the protection feedback circuitry 816 is implemented by other hardware logic circuitry, hardware implemented state machines, and/or any other combination of hardware, software, and/or firmware. For example, the protection feedback circuitry 816 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the protection orchestrating circuitry 202 includes means for classifying the protection remediation action based on at least one of the digital assets associated with the protection remediation actions or user devices utilized to access the digital asset. For example, the means for classifying the protection remediation action may be implemented by protection selecting circuitry 812. In some examples, the protection selecting circuitry 812 may be implemented by machine executable instructions such as that implemented by at least block 1016 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the protection selecting circuitry 812 is implemented by other hardware logic circuitry, hardware implemented state machines, and/or any other combination of hardware, software, and/or firmware. For example, the protection selecting circuitry 812 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the protection orchestrating circuitry 202 includes means for causing the protection remediation action to be dispatched. For example, the means for causing the protection remediation action to be dispatched may be implemented by protection dispatching circuitry 814. In some examples, the protection dispatching circuitry 814 may be implemented by machine executable instructions such as that implemented by at least block 1020 of FIG. 10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the protection dispatching circuitry 814 is implemented by other hardware logic circuitry, hardware implemented state machines, and/or any other combination of hardware, software, and/or firmware. For example, the protection dispatching circuitry 814 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 9:
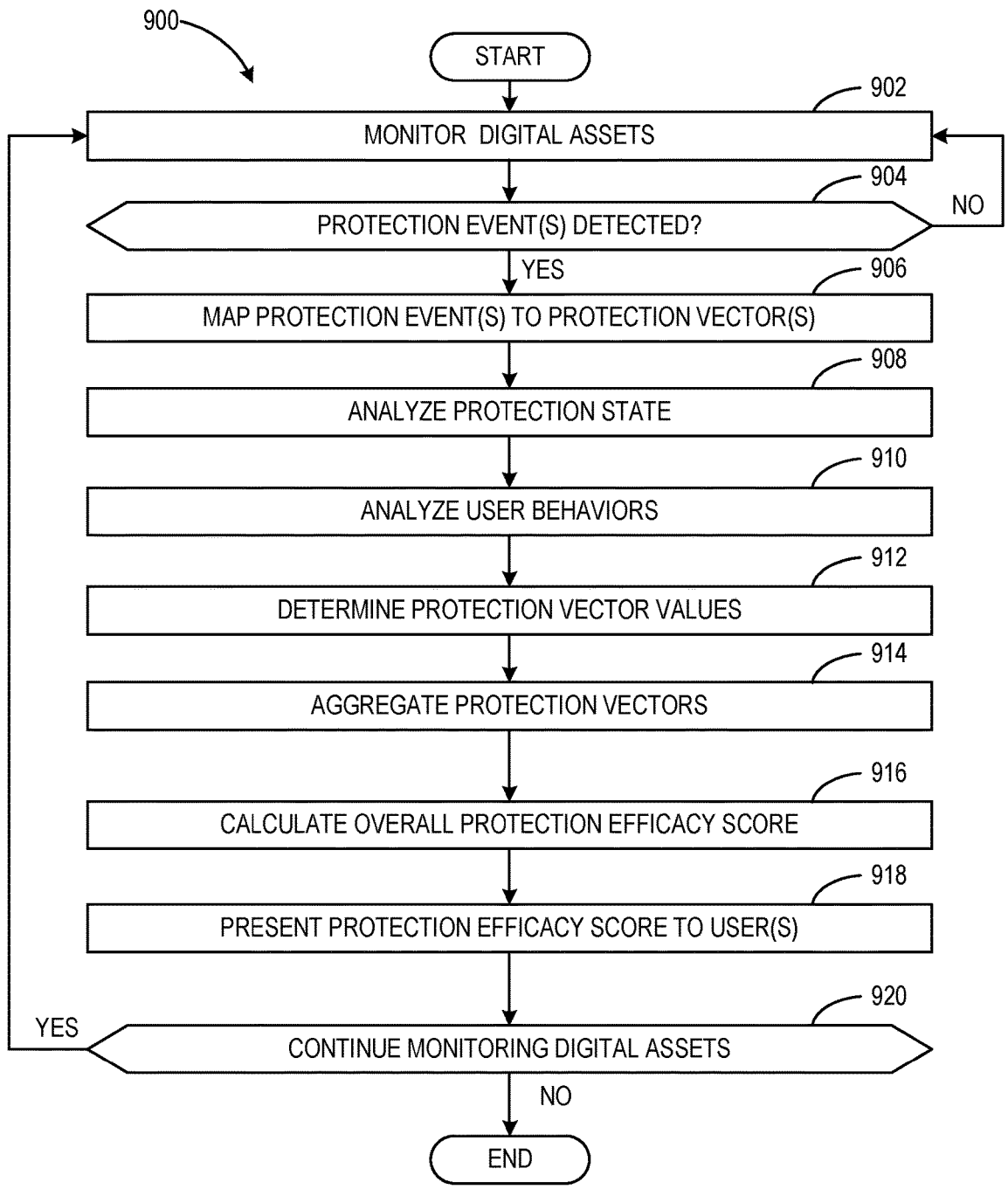
FIG. 9 is a flowchart representative of example machine readable instructions that may be executed by example processor circuitry to implement the example protection circuitry of FIG. 2.
Figure 10:
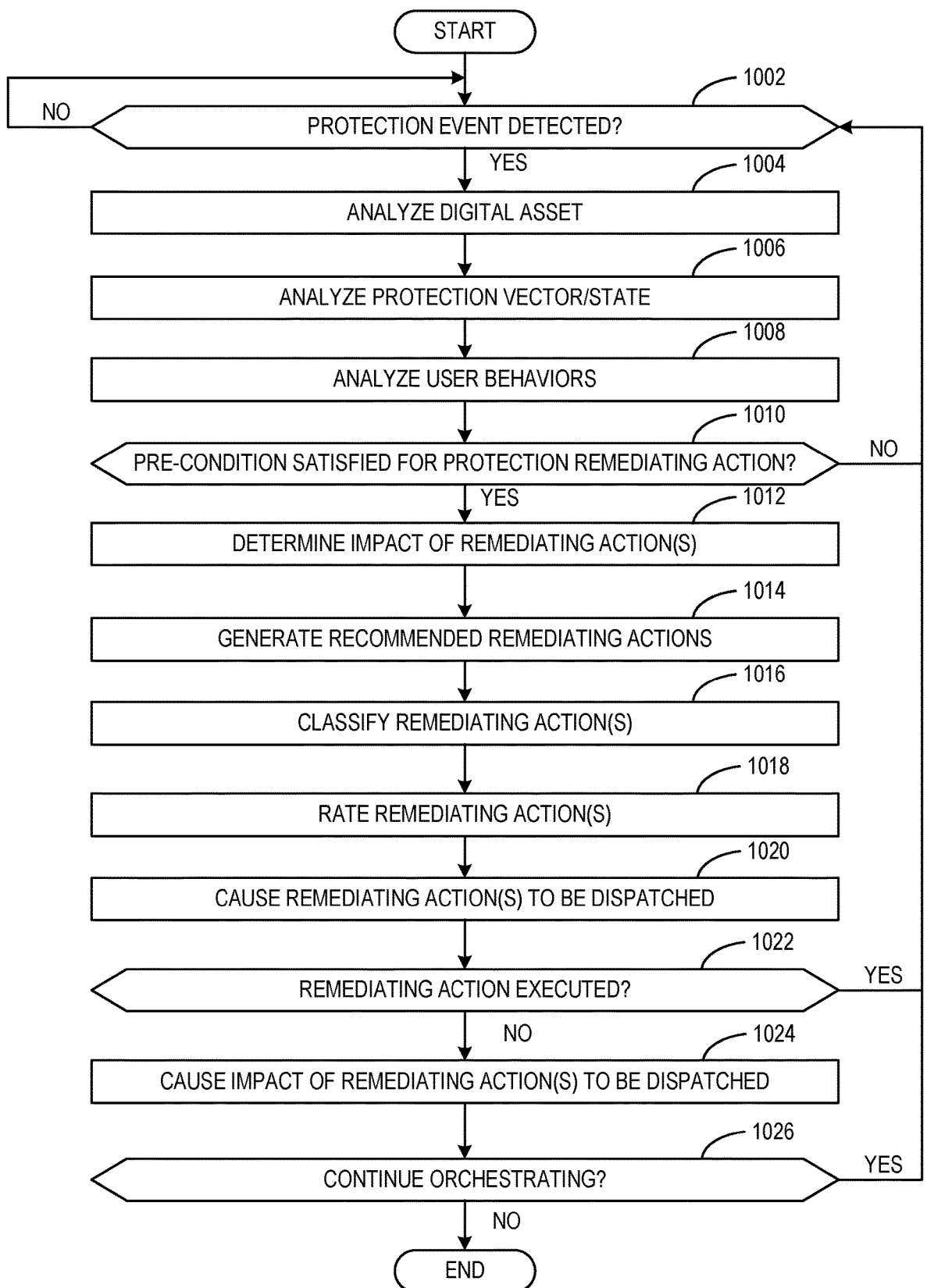
FIG. 10 is a flowchart representative of example machine readable instructions that may be executed by example processor circuitry to implement the example protection orchestrating circuitry of FIGS. 2 and/or 8.

While an example manner of implementing the protection circuitry 130 of FIGS. 1, 2, and/or 8 is illustrated in FIGS. 9 and 10, one or more of the elements, processes, and/or devices illustrated in FIGS. 9 and 10 may be combined, divided, re-arranged, omitted, eliminated, and/or implemented in any other way. Further, the example local assets 110, the example user devices 112, 114, the example local data 116, the example device sensors 118, the example cloud assets 120, the example user content data 122, the example user identity data 124, the example user account data 126, the example user interaction data 128, the example protection control circuitry 202, 204, 206, the example digital asset database 208, the example state analyzing circuitry 210, the example event analyzing circuitry 212, the example behavior analyzing circuitry 214, the example vector determining circuitry 216, the example score determining circuitry 218, the example protection orchestrating circuitry 220, the example protection database 222, the example user behavior database 224, the example protection sensor(s) 230, the example cloud asset protection circuitry 232, the example local asset protection circuitry 234, the example asset analyzing circuitry 802, the example protection analyzing circuitry 804, the example user analyzing circuitry 806, the example protection generating circuitry 808, the example recommendation database 810, the example protection selecting circuitry 812, the example protection dispatching circuitry 814, the example protection feedback circuitry 816, and/or, more generally, the example protection circuitry 130 may be implemented by hardware, software, firmware, and/or any combination of hardware, software, and/or firmware. Thus, for example, any of the example local assets 110, the example user devices 112, 114, the example local data 116, the example device sensors 118, the example cloud assets 120, the example user content data 122, the example user identity data 124, the example user account data 126, the example user interaction data 128, the example protection control circuitry 202, 204, 206, the example digital asset database 208, the example state analyzing circuitry 210, the example event analyzing circuitry 212, the example behavior analyzing circuitry 214, the example vector determining circuitry 216, the example score determining circuitry 218, the example protection orchestrating circuitry 220, the example protection database 222, the example user behavior database 224, the example protection sensor(s) 230, the example cloud asset protection circuitry 232, the example local asset protection circuitry 234, the example asset analyzing circuitry 802, the example protection analyzing circuitry 804, the example user analyzing circuitry 806, the example protection generating circuitry 808, the example recommendation database 810, the example protection selecting circuitry 812, the example protection dispatching circuitry 814, the example protection feedback circuitry 816, and/or, more generally, the example protection circuitry 130, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example local assets 110, the example user devices 112, 114, the example local data 116, the example device sensors 118, the example cloud assets 120, the example user content data 122, the example user identity data 124, the example user account data 126, the example user interaction data 128, the example protection control circuitry 202, 204, 206, the example digital asset database 208, the example state analyzing circuitry 210, the example event analyzing circuitry 212, the example behavior analyzing circuitry 214, the example vector determining circuitry 216, the example score determining circuitry 218, the example protection orchestrating circuitry 220, the example protection database 222, the example user behavior database 224, the example protection sensor(s) 230, the example cloud asset protection circuitry 232, the example local asset protection circuitry 234, the example asset analyzing circuitry 802, the example protection analyzing circuitry 804, the example user analyzing circuitry 806, the example protection generating circuitry 808, the example recommendation database 810, the example protection selecting circuitry 812, the example protection dispatching circuitry 814, and the example protection feedback circuitry 816 is/are hereby expressly defined to include a non-transitory computer readable storage device or storage disk such as a memory, a digital versatile disk (DVD), a compact disk (CD), a Blu-ray disk, etc., including the software and/or firmware. Further still, the example protection circuitry 130 of FIGS. 1, 2, and/or 8 may include one or more elements, processes, and/or devices in addition to, or instead of, those illustrated in FIGS. 1, 2 and/or 8, and/or may include more than one of any or all of the illustrated elements, processes, and devices.

Flowcharts representative of example hardware logic circuitry, machine readable instructions, hardware implemented state machines, and/or any combination thereof for implementing the protection circuitry 130 of FIGS. 1, 2, and/or 8 are shown in FIGS. 9 and 10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 9 and 10, many other methods of implementing the example protection circuitry 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9 and 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to determine an overall protection posture of a protection threat surface associated with one or more users. The machine readable instructions and/or operations 900 of FIG. 9 begin at block 902, at which the protection circuitry 130 monitors digital assets associated with the user(s). For example, the protection control circuitry 202, 204, 206 can monitor the digital assets and, thus, a protection threat surface associated with the user(s). In some examples, the protection sensor(s) 230, the cloud asset protection circuitry 232, and/or the local asset protection circuitry 234 can scan a user device (e.g., a first digital asset) to monitor digital assets (e.g., a second digital asset, a third digital asset, etc.), such as local data 116, device sensors 118, user content data 122, user identity data 124, user account data 126, and/or user interaction data, associated with the user(s). In some examples, the protection sensor(s) 230, the cloud asset protection circuitry 232, and/or the local asset protection circuitry 234 record an indication of the digital assets and characteristics associated therewith (e.g., a type, an associated user, etc.) in the digital asset database 208.

At block 904, the protection circuitry 130 determines whether one or more protection events have been detected. For example, the protection control circuitry 202, 204, 206 can detect the protection event(s) based on a state or configuration associated with one or more of the digital assets, external events encountered by the digital assets, and/or user actions performed on the digital assets. In some examples, the protection sensor(s) 230, the cloud asset protection circuitry 232, and/or the local asset protection circuitry 234 sense the protection event(s). In some examples, in response to detecting the protection event(s), the protection sensor(s) 230, the cloud asset protection circuitry 232, and/or the local asset protection circuitry 234 perform protection telemetry to relay the protection event(s) to the state analyzing circuitry 210, the event analyzing circuitry 212, and/or the behavior analyzing circuitry 214. In response to the protection circuitry 130 detecting the protection event(s), the machine readable instructions 900 continue to block 906. Otherwise, in response to the protection circuitry 130 not detecting the protection event(s), the machine readable instructions 900 return to block 902.

At block 906, the protection circuitry 130 maps the detected protection event(s) to one or more protection vectors. For example, the event analyzing circuitry 212 can map the protection event(s) to determine the protection vector(s) based on the digital asset(s) affected by the protection event(s) and/or a protection capabilit(ies) associated with the protection vector(s). In some examples, the event analyzing circuitry 212 records the protection event(s) in the protection database 222.

At block 908, the protection circuitry 130 analyzes a protection state(s) of the digital asset(s). For example, the state analyzing circuitry 210 determines the protection state(s) of the digital asset(s) based on the detected protection event(s). In some examples, the state analyzing circuitry 210 analyzes an impact of the protection event(s) on the digital asset(s) to determine the protection state(s) associated therewith. In some examples, the state analyzing circuitry 210 records the protection state(s) of the digital asset(s) in the protection database 222.

At block 910, the protection circuitry 130 analyzes user behaviors associated with the digital assets. For example, the behavior analyzing circuitry 214 can analyze user digital interactions to determine relative notional values that the user(s) associated with respective digital assets. In some examples, the behavior analyzing circuitry 214 determines a compliance level and/or security awareness of the user(s) based on the detected protection event(s). In some examples, the behavior analyzing circuitry 214 records the user behaviors in the user behavior database 224.

At block 912, the protection circuitry 130 determines values associated with the protection vector(s). For example, the vector determining circuitry 216 can determine protection vectors corresponding to protection capabilities associated with the digital assets based on the respective protection event(s) associated with the protection vectors. The vector determining circuitry 216 assigns weights (e.g., impact weights) to the respective protection vector, which serves as a value in the protection vector. In some examples, the protection circuitry 130 records the protection vector(s) in the protection database 222.

At block 914, the protection circuitry 130 aggregates protection vectors. For example, the score determining circuitry 218 can utilize equation [2] to aggregate the protection vectors and compute an acquired score associated with the protection threat surface. In some examples, the score determining circuitry 218 averages the protection vectors along with the respective notional values associated therewith to aggregate the protection vectors.

At block 916, the protection circuitry 130 calculates an overall protection efficacy score for the protection threat surface. For example, the score determining circuitry 218 can utilize equation [1] to compute the overall protection efficacy score based on a ratio between the acquired score and a maximum possible score for the acquired score. Accordingly, the overall protection efficacy score is based on notional values. In some examples, the score determining circuitry 218 records the overall protection efficacy score in the protection database 222.

At block 918, the protection circuitry 130 presents the overall protection efficacy score to the user(s). For example, the score determining circuitry 218 can present the overall protection efficacy score to one or more of the digital assets associated with the users.

At block 920, the protection circuitry 130 determines whether to continue monitoring the digital assets. For example, the cloud asset protection circuitry 232 and/or the local asset protection circuitry 234 can determine that monitoring of the digital assets is to continue in response to having access to the digital assets. When the monitoring of the digital assets is to continue, the machine readable instructions 900 return to block 902. Otherwise, the machine readable instructions 900 terminate.

FIG. 10 is a flowchart representative of example machine readable instructions and/or example operations 1000 that may be executed and/or instantiated by processor circuitry to determine protection remediating actions that improve the overall protection posture of the protection threat surface associated with the user(s). The machine readable instructions and/or operations 1000 of FIG. 10 begin at block 1002, at which the protection orchestrating circuitry 220 determines whether one or more protection events have been detected. For example, the asset analyzing circuitry 208 can determine the protection event(s) has occurred in response to receiving a signal indicative of the protection event via the event analyzing circuitry 212. In response to the protection event being detected, the machine readable instructions continue to block 1004. Otherwise, the machine readable instructions remain at block 1002.

At block 1004, the protection orchestrating circuitry 220 analyzes the digital asset associated with the protection event. For example, the asset analyzing circuitry 802 can determine the digital asset associated with the protection event via the digital asset database 208. In some examples, the asset analyzing circuitry 802 obtains an identification value associated with the digital asset in response to the protection event(s) occurring. In some examples, the asset analyzing circuitry 802 can identify characteristics associated with the digital asset, such as a digital asset type and/or protection capabilities associated with the digital asset, via the digital asset database 208.

At block 1006, the protection orchestrating circuitry 220 analyzes protection vectors and/or a protection state associated with the digital asset. For example, the protection analyzing circuitry 804 can determine the protection vectors and/or the protection state associated with the digital asset via the protection database 222. In some examples, the protection analyzing circuitry 804 analyzes the protection vectors and/or the protection state to identify a trend associated with the protection vector(s) and/or the overall protection efficacy score for the protection threat surface (e.g., the environment 100 of FIG. 1).

At block 1008, the protection orchestrating circuitry 220 analyzes user behaviors associated with the digital asset. For example, the user analyzing circuitry 806 can identify user behaviors associated with the digital asset via the user behavior database 224. In some examples, the user analyzing circuitry 806 analyzes a security awareness of the user, a compliance level of the user (e.g., a frequency according to which the user acts in response to receiving a protection recommendation), and/or a notional value of the digital asset associated with the protection event.

At block 1010, the protection orchestrating circuitry 220 determines whether a pre-condition associated with a protection remediating action has been satisfied. For example, the protection generating circuitry 808 can compare the encountered protection event to pre-conditions associated with the protection remediating actions stored in the recommendation database 810. Accordingly, in response to the encountered protection event matching a pre-condition in the recommendation database 810, the protection generating circuitry can determine that a protection remediating action is to be implemented and the machine readable instructions proceed to block 1012. In response to the encountered protection event not matching any pre-conditions in the recommendation database 810, the machine readable instructions return to block 1002.

At block 1012, the protection orchestrating circuitry 220 determines an impact of the protection remediating actions. For example, the protection generating circuitry 808 can determine an effect of the protection remediating action on an associated protection vector. In turn, the protection generating circuitry 808 can determine an impact of the protection remediating action on an overall protection posture associated with the protection threat surface. For example, the protection generating circuitry 808 can determine the impact of the protection remediating action based on a weight associated with the protection vector. In some examples, the protection generating circuitry 808 transmits the resulting protection vector to the score determining circuitry 218, which calculates the protection efficacy score that would result from the protection remediating action being implemented. Accordingly, the protection generating circuitry 808 can determine an improvement to the protection efficacy score based on the current protection efficacy score and the protection efficacy score resulting from the implementation of the protection remediating action.

At block 1014, the protection orchestrating circuitry 220 generates protection remediating actions to be implemented. For example, the protection generating circuitry 808 can determine the protection remediating action(s) that corresponds with the satisfied pre-condition. In some examples, the protection generating circuitry 808 utilizes a rule-based model or a machine learning-based model to identify the protection remediating action(s). In some examples, when the protection generating circuitry 808 utilizes the rule-based model, the protection generating circuitry 808 determines the remediating action or a component of the remediating action (e.g., a remediating action type, a remediating action priority, etc.) based on the protection event and the impact of the protection event on the associated protection vector(s) and/or the overall protection efficacy score. In some examples, the protection generating circuitry 808 generates a protection remediating action in response to a corresponding protection efficacy score improvement satisfying (e.g., surpassing) a threshold score improvement. In some examples, when the protection generating circuitry 808 utilizes the machine learning-based model, the protection generating circuitry 808 generates the protection remediating action based on characteristics associated with the digital asset, user behaviors, and/or an impact of the protection events on the protection vectors or the overall protection efficacy score.

At block 1016, the protection orchestrating circuitry 220 classifies the generated protection remediating actions. For example, the protection selecting circuitry 812 can classify (e.g., group) the generated protection remediating actions based on the digital asset associated therewith, a type of the digital asset, and/or a user device utilized to access the digital asset.

At block 1018, the protection orchestrating circuitry 220 rates the generated protection remediating actions. For example, the protection selecting circuitry 812 can rate (e.g., prioritize) the protection remediating actions based on the protection vector(s) (e.g., a weight associated with the protection vectors, a value change in the protection vector(s), etc.), information associated with the digital asset (e.g., an asset value, an asset type, an asset access device, etc.), and/or information associated with the user(s) (e.g., user awareness level, user context, etc.). In some examples, the protection selecting circuitry 812 rates the protection remediating actions based on an impact of the protection remediating action on the overall protection efficacy score and/or a notional value associated with the respective digital asset associated with the protection event.

At block 1020, the protection orchestrating circuitry 220 causes the protection remediating actions to be dispatched to one or more of the user devices 112, 114. For example, the protection dispatching circuitry 814 can dispatch the protection remediating actions based on the ratings associated therewith. In some examples, the protection dispatching circuitry 814 determines which of the user devices 112, 114 to dispatch the protection remediating action to based on the user device most frequently utilized, the user device most frequently utilized to access the digital asset associated with the recommendation and/or advice. In some examples, the protection dispatching circuitry 814 determines a time at which the protection remediating action is to be generated based on a user type (e.g., whether the user is a child or an adult, an awareness level associated with the user(s), other user context, etc.) and activity patterns associated with the user(s) (e.g., a time frame according to which the user(s) typically utilizes the certain user devices 112, 114). In some examples, the protection dispatching circuitry 814 indicates the protection remediating action, the user device 112, 114 associated with the protection remediating action, the time of day to surface the protection remediating action, and the priority level of the protection remediating action to the protection control circuitry 202, 204, 206, which can implement the protection remediating action or present a message indicative of the protection remediating action to the user(s). Accordingly, the user(s) can perform the protection remediating action or provide authorization for the cloud asset protection circuitry 232 and/or the local asset protection circuitry 234 to perform the protection remediating action.

At block 1022, the protection orchestrating circuitry 220 determines whether the protection remediating action has been executed. For example, the protection feedback circuitry 816 can determine whether the protection remediating action was executed in response to a user action (e.g., user selecting "ignore" when asked to implement protection remediation, user selecting "execute" when asked to implement the protection remediation, user selecting a time for the protection remediation to be implemented) and/or in response to a threshold amount of time passing between the protection recommendation being transmitted to the user device. In response to protection remediating action not being executed, the machine readable instructions proceed to block 1024. Otherwise, the machine readable instructions return to block 1002.

At block 1024, the protection orchestrating circuitry 220 causes the impact of the protection remediating action(s) to be dispatched to at least one of the user devices 112, 114. For example, the protection feedback circuitry 816 causes the protection dispatching circuitry 814 to transmit the impact of the protection remediating action to the protection control circuitry 202. In some examples, the protection dispatching circuitry 816 transmits the overall protection efficacy score change that would occur in response to the protection remediating action being implemented to provide the user(s) with a clear understanding of the impact provided by the protection remediating action. In turn, the cloud asset protection circuitry 232 and/or the local asset protection circuitry 234 can dispatch the impact of the protection remediating action to one or more of the user devices 112, 114.

At block 1026, the protection orchestrating circuitry 220 determines whether to continue orchestrating protection remediating actions for the digital assets. For example, the protection dispatching circuitry 814 can determine that orchestrating protection of the digital assets is to continue in response to the cloud asset protection circuitry 232 and/or the local asset protection circuitry 234 having access to the digital assets. When the monitoring of the digital assets is to continue, the machine readable instructions 1000 return to block 1002. Otherwise, the machine readable instructions 1000 terminate.

Figure 11:
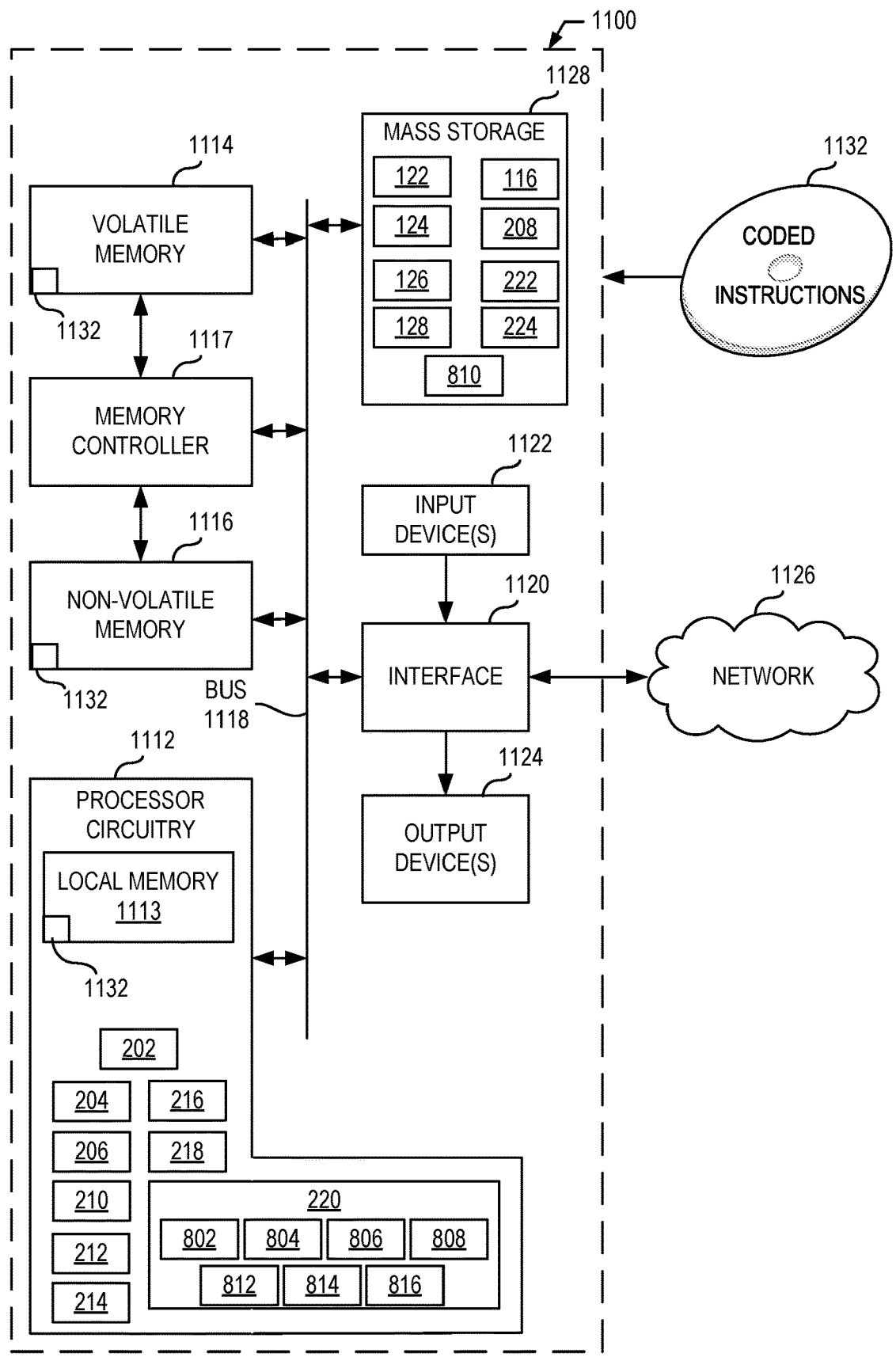
FIG. 11 is a block diagram of an example processing platform including processor circuitry structured to execute the example machine readable instructions of FIG. 3 to implement the protection circuitry of FIG. 2.

FIG. 11 is a block diagram of an example processor platform 1100 structured to execute and/or instantiate the machine readable instructions and/or operations of FIGS. 9 and 10 to implement the apparatus of FIGS. 1, 2, and/or 8. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example protection control circuitry 202, 204, 206, the example digital asset database 208, the example state analyzing circuitry 210, the example event analyzing circuitry 212, the example behavior analyzing circuitry 214, the example vector determining circuitry 216, the example score determining circuitry 218, the example protection remediating circuitry 220, the example asset analyzing circuitry 802, the example protection analyzing circuitry 804, the example user analyzing circuitry 806, the example protection generating circuitry 808, the example protection selecting circuitry 812, the example protection dispatching circuitry 814, and the example protection feedback circuitry 816.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives. In some examples, the mass storage 1028 includes the local data 116, the user content data 122, the user identity data 124, the user account data 126, the user interaction data 128, the digital asset database 208, the protection database 222, the user behavior database 224, and the recommendation database 810.

The machine executable instructions 1132, which may be implemented by the machine readable instructions of FIGS. 9 and 10, may be stored in the mass storage device 1128, in the volatile memory 1114, in the non-volatile memory 1116, and/or on a removable non-transitory computer readable storage medium such as a CD or DVD.

Figure 12:
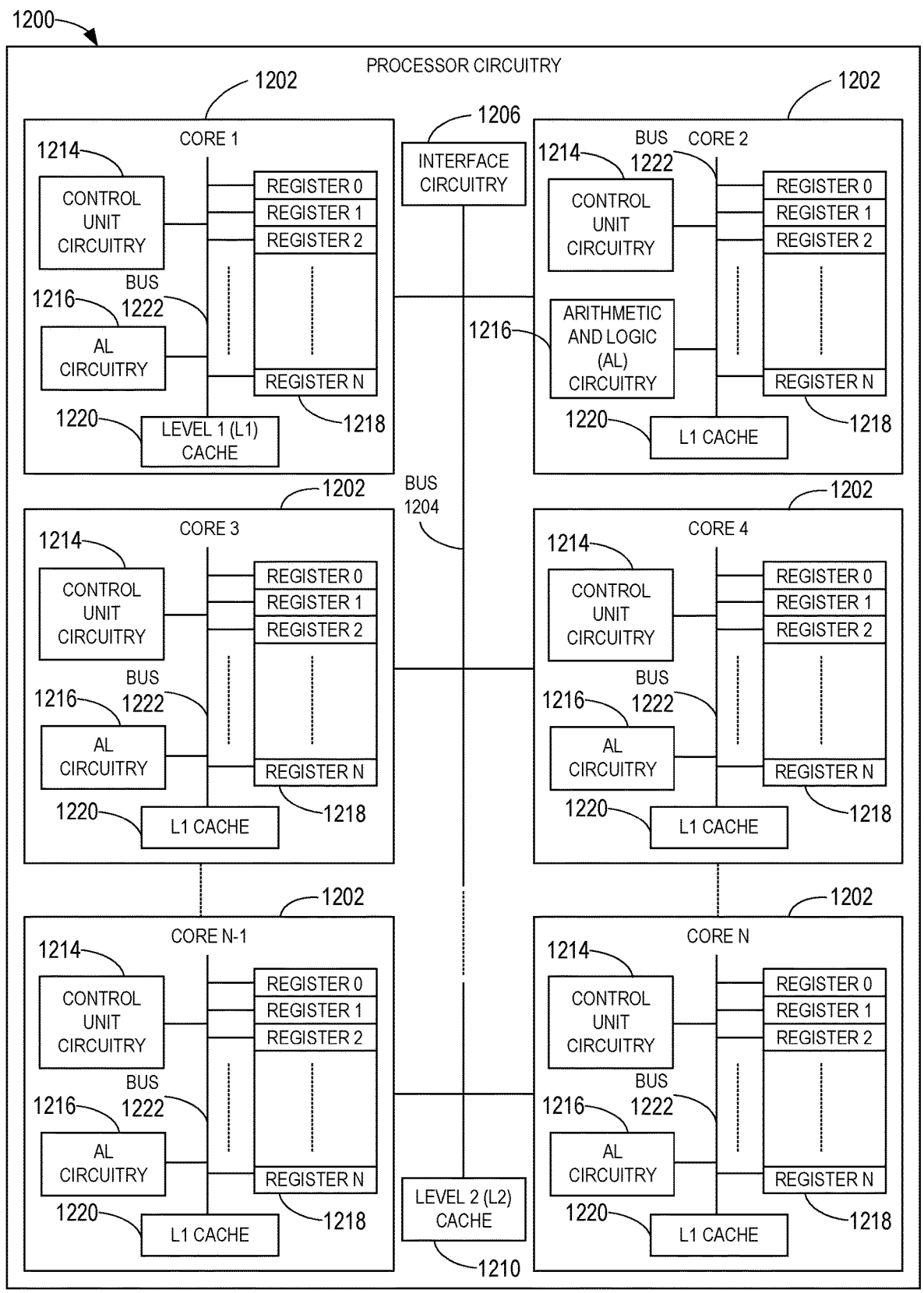
FIG. 12 is a block diagram of an example implementation of the processor circuitry of FIG. 4.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIGS. 9 and 10.

The cores 1202 may communicate by an example bus 204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1220 may implement at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
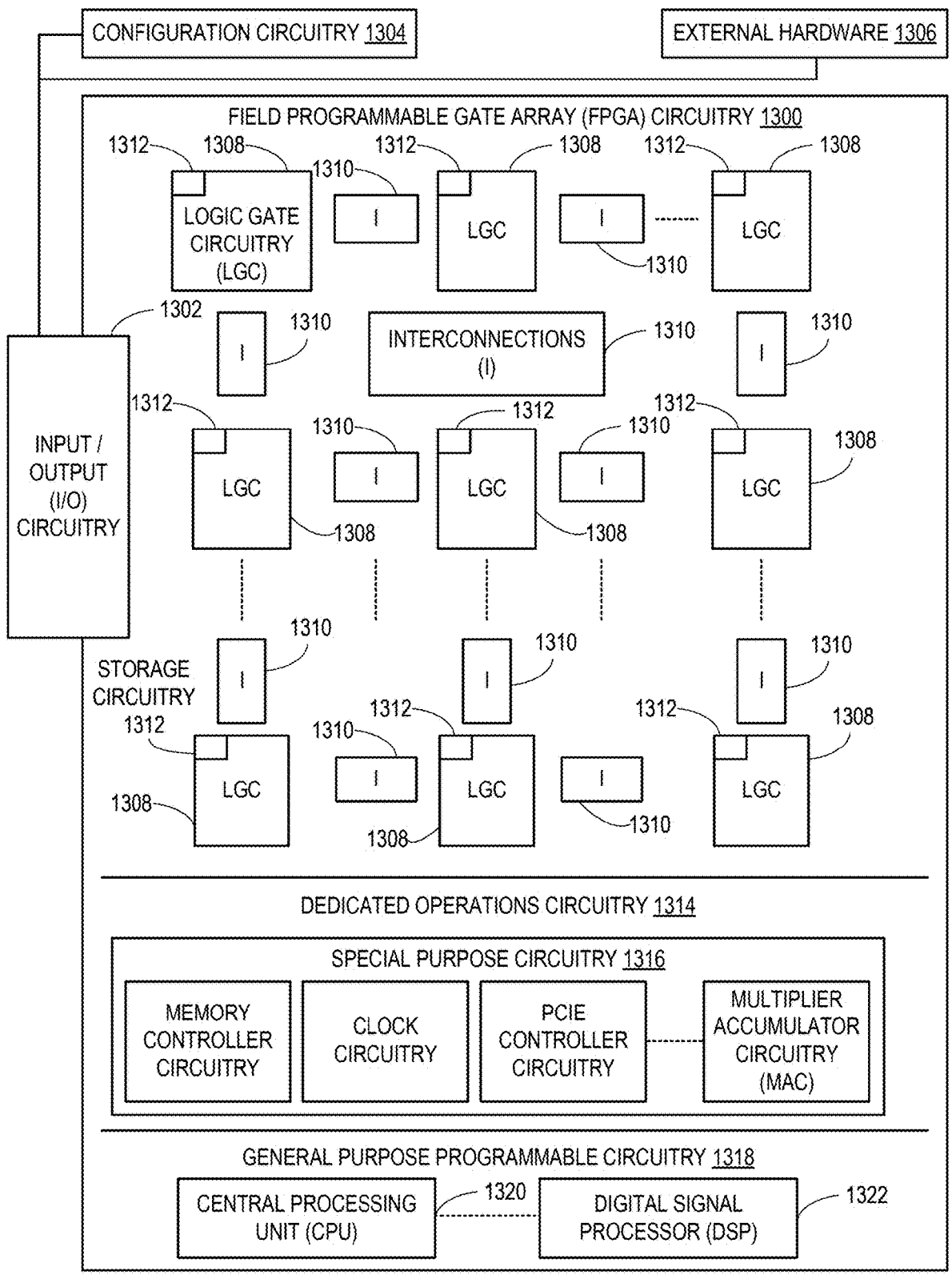
FIG. 13 is a block diagram of another example implementation of the processor circuitry of FIG. 4.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 9 and 10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 9 and 10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 9 and 10. As such, the FPGA circuitry 1300 may be structured to effectively instantiate some or all of the machine readable instructions of the flowcharts of FIGS. 9 and 10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 9 and 10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1300 of FIG. 5. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIG. 13 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 6 illustrate two example implementations of the processor circuitry 1112 of FIG. 11, many other approaches are contemplated. For example, as mentioned above, modern FPGA circuitry may include an onboard CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 9 and 10 may be executed by one or more of the cores 1202 of FIG. 12 and a second portion of the machine readable instructions represented by the flowcharts of FIGS. 9 and 10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
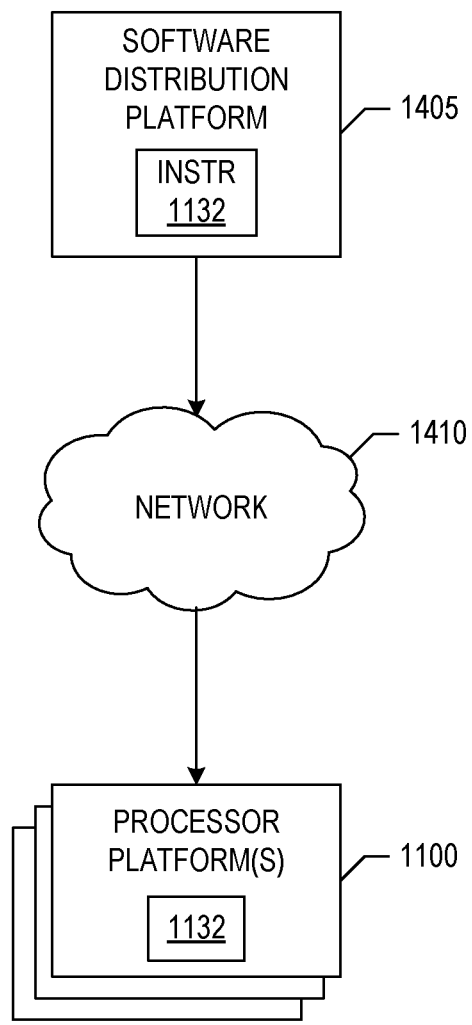
FIG. 14 is a block diagram of an example software distribution platform (e.g., one or more servers) to distribute software (e.g., software corresponding to the example machine readable instructions of FIGS. 11 and 12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 900, 1000 of FIGS. 9 and 10, as described above. The one or more servers of the example software distribution platform 1405 are in communication with a network 1410, which may correspond to any one or more of the Internet and/or any of the example networks 102, 1126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 900 and 1000 of FIGS. 9 and 10, may be downloaded to the example processor platform 1100, which is to execute the machine readable instructions 1132 to implement the protection circuitry 130. In some example, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example methods, apparatus and articles of manufacture have been disclosed that orchestrate protection of user devices and other digital assets from privacy, security, identity and/or trust threats. The disclosed methods, apparatus and articles of manufacture improve the efficiency of using a computing device by automatically generating, prioritizing, and dispatching protection remediating actions to orchestrate protection for all the digital assets associated with one or more users. As such, the disclosed methods, apparatus and articles of manufacture improve user experiences by dispatching protection remediating actions of greater value to the user(s) while avoiding dispatching protection remediating actions associated with reduced impact to an overall protection posture of the digital assets. Additionally, the disclosed methods, apparatus and articles of manufacture cause the protection remediating actions to be dispatched to user devices associated with the protection remediating actions and times that the user(s) utilize the user devices to increase a likelihood of that the user(s) executes the protection remediating action. Further, the disclosed methods, apparatus and articles of manufacture cause an impact associated with the protection remediating actions to be dispatched to the user(s) in response to the protection remediating actions not being executed upon an original request. As such, the disclosed methods, apparatus and articles of manufacture provide the user(s) with a clear understanding of the value of the protection remediating actions and, thus, increase a likelihood that the user(s) execute the protection remediating actions. The disclosed methods, apparatus and articles of manufacture are accordingly directed to one or more improvement(s) in the functioning of a computer.

Example methods, apparatus, systems, and articles of manufacture to orchestrate personal protection across digital assets are disclosed herein. Further examples and combinations thereof include the following:

Example 1 includes an apparatus comprising at least one memory, instructions in the apparatus, processor circuitry to execute the instructions to monitor digital assets associated with a protection threat surface to detect a protection event, determine one or more protection vectors associated with the protection threat surface in response to detecting the protection event, the one or more protection vectors including one or more values corresponding to an impact of the protection event on an overall protection posture associated with the protection threat surface, and determine a protection remediation action for the protection threat surface based on the one or more protection vectors.

Example 2 includes the apparatus of example 1, wherein the processor circuitry is to determine a priority of the determined protection remediation action based on an impact of the determined protection remediation action on the overall protection posture.

Example 3 includes the apparatus of example 2, wherein the processor circuitry is to update the one or more protection vectors to correspond to an implementation of the protection remediation action, and determine an improvement to an overall protection efficacy score based on the one or more protection vectors to determine the impact of the determined protection remediation action.

Example 4 includes the apparatus of example 3, wherein the processor circuitry is to cause the improvement to the overall protection efficacy score to be dispatched to one or more user devices in response to the protection remediation action not being executed.

Example 5 includes the apparatus of example 1, wherein the protection remediation action is a first protection remediation action and the protection event is a first protection event, wherein the processor circuitry is to determine the one or more protection vectors based on at least one of the first protection event or a second protection event, determine a second protection remediation action for the protection threat surface based on the one or more protection vectors, and prioritize the first protection remediation action or the second protection remediation action based on impact weights associated with the one or more protection vectors and notional values associated with the digital assets.

Example 6 includes the apparatus of example 1, wherein the processor circuitry is to utilize a rule-based model to determine the protection remediation action, the rule-based model to determine the protection remediation action based on the protection event and an impact of the protection event on the one or more protection vectors.

Example 7 includes the apparatus of example 1, wherein the processor circuitry is to utilize a machine learning-based model to determine the protection remediation action, the machine learning-based model to process the protection event, an impact of the protection event on the one or more protection vectors, and user behaviors associated with the digital assets to determine the protection remediation action.

Example 8 includes the apparatus of example 1, wherein the processor circuitry is to assign the protection remediation action to a group based on at least one of the digital assets associated with the protection remediation action or a user device utilized to access the digital asset.

Example 9 includes the apparatus of example 1, wherein the processor circuitry is to identify at least one of the digital assets of the protection threat surface associated with the protection remediation action, determine a time that a user frequently utilizes the user device, and cause the determined protection remediation action to be dispatched to the user device at the time.

Example 10 includes the apparatus of example 1, wherein the protection threat surface includes user devices associated with more than one user.

Example 11 includes a non-transitory machine readable medium comprising instructions which, when executed, cause one or more processors to monitor digital assets associated with a protection threat surface to detect a protection event, determine one or more protection vectors associated with the protection threat surface in response to detecting the protection event, the one or more protection vectors including one or more values corresponding to an impact of the protection event on an overall protection posture associated with the protection threat surface, and determine a protection remediation action for the protection threat surface based on the one or more protection vectors.

Example 12 includes the non-transitory machine readable medium of example 11, wherein the instructions, when executed, cause the one or more processors to determine a priority of the determined protection remediation action based on an impact of the determined protection remediation action on the overall protection posture.

Example 13 includes the non-transitory machine readable medium of example 12, wherein the instructions, when executed, cause the one or more processors to update the one or more protection vectors to correspond with an implementation of the protection remediation action, and determine an improvement to an overall protection efficacy score based on the one or more protection vectors to determine the impact of the determined protection remediation action.

Example 14 includes the non-transitory machine readable medium of example 13, wherein the instructions, when executed, cause the one or more processors to cause the improvement to the overall protection efficacy score to be dispatched to one or more user devices surface in response to the protection remediation action not being executed.

Example 15 includes the non-transitory machine readable medium of example 11, wherein the protection remediation action is a first protection remediation action and the protection event is a first protection event, wherein the instructions, when executed, cause the one or more processors to determine the one or more protection vectors based on at least one of the first protection event or a second protection event, determine a second protection remediation action for the protection threat surface based on the one or more protection vectors prioritize the first protection remediation action or the second protection remediation action based on impact weights associated with the one or more protection vectors and notional values associated with the digital assets.

Example 16 includes the non-transitory machine readable medium of example 11, wherein the instructions, when executed, cause the one or more processors to utilize a rule-based model to determine the protection remediation action, the rule-based model to determine the protection remediation action based on the protection event and an impact of the protection event on the one or more protection vectors.

Example 17 includes the non-transitory machine readable medium of example 11, wherein the instructions, when executed, cause the one or more processors to utilize a machine learning-based model to determine the protection remediation action, the machine learning-based model to process the protection event, an impact of the protection event on the one or more protection vectors, and user behaviors associated with the digital assets to determine the protection remediation action.

Example 18 includes the non-transitory machine readable medium of example 11, wherein the instructions, when executed, cause the one or more processors to assign the protection remediation action to a group based on at least one of the digital assets associated with the protection remediation action or a user device utilized to access the digital asset.

Example 19 includes the non-transitory machine readable medium of example 11, wherein the instructions, when executed, cause the one or more processors to identify at least one of the digital assets of the protection threat surface associated with the protection remediation action, determine a time that a user frequently utilizes the user device, and cause the determined protection remediation action to be dispatched to the user device at the time.

Example 20 includes the non-transitory machine readable medium of example 11, wherein at least one of the digital assets is associated with more than one user device.

Example 21 includes an apparatus comprising means for monitoring digital assets associated with a protection threat surface to detect a protection event, means for determining protection vectors associated with the protection threat surface in response to detecting the protection event, the one or more protection vectors including one or more values corresponding to an impact of the protection event on an overall protection posture associated with the protection threat surface, and means for determining a protection remediation action for the protection threat surface based on the one or more protection vectors.

Example 22 includes the apparatus of example 21, further including means for determining a priority of the determined protection remediation action based on an impact of the determined protection remediation action on the overall protection posture.

Example 23 includes the apparatus of example 22, wherein the means for determining the protection remediation action is to update the one or more protection vectors to correspond with an implementation of the protection remediation action, and determine an improvement to an overall protection efficacy score based on the one or more protection vectors to determine the impact of the determined protection remediation action.

Example 24 includes the apparatus of example 23, further including means for causing the improvement to the overall protection efficacy score to be dispatched to one or more user devices in response to the protection remediation action not being executed.

Example 25 includes the apparatus of example 21, further including means for determining a priority of the determined protection remediation action based on one or more impact weights associated with corresponding ones of the one or more protection vectors and notional values associated with the digital assets.

Example 26 includes the apparatus of example 21, wherein the means for determining the protection remediation action is to utilize a rule-based model to determine the protection remediation action, the rule-based model to determine the protection remediation action based on the protection event and the impact of the protection event on the one or more protection vectors.

Example 27 includes the apparatus of example 21, wherein the means for determining the protection remediation action is to utilize a machine learning-based model to determine the protection remediation action, the machine learning-based model to process the protection event, an impact of the protection event on the one or more protection vectors, and user behaviors associated with the digital assets to determine the protection remediation action.

Example 28 includes the apparatus of example 21, further including means for classifying the protection remediation action based on at least one of the digital assets associated with the protection remediation action or a user device utilized to access the digital asset.

Example 29 includes the apparatus of example 21, further including means for causing the protection remediation action to be dispatched to identify at least one of the digital assets of the protection threat surface associated with the protection remediation action, determine a time that a user frequently utilizes the user device, and cause the determined protection remediation action to be dispatched to the user device at the time.

Example 30 includes the apparatus of example 21, wherein the protection threat surface includes user devices associated with more than one user.

Example 31 includes a method comprising monitoring digital assets associated with a protection threat surface to detect a protection event, determining one or more protection vectors associated with the protection threat surface in response to detecting the protection event, the one or more protection vectors including one or more values corresponding to an impact of the protection event on an overall protection posture associated with the protection threat surface, and determining a protection remediation action for the protection threat surface based on the one or more protection vectors.

Example 32 includes the method of example 31, further including determining a priority of the determined protection remediation action based on an impact of the determined protection remediation action on the overall protection posture of the digital assets.

Example 33 includes the method of example 32, further including updating the one or more protection vectors to correspond with an implementation of the protection remediation action, and determining an improvement to an overall protection efficacy score based on the one or more protection vectors to determine the impact of the determined protection remediation action.

Example 34 includes the method of example 33, further including causing the improvement to the overall protection efficacy score to be dispatched to one or more user devices in response to the protection remediation action not being executed.

Example 35 includes the method of example 31, further including prioritizing the determined protection remediation action based on impact weights associated with the one or more protection vectors and notional values associated with the digital assets.

Example 36 includes the method of example 31, further including utilizing a rule-based model to determine the protection remediation action, the rule-based model to determine the protection remediation action based on the protection event and the impact of the protection event on the one or more protection vectors.

Example 37 includes the method of example 31, further including utilizing a machine learning-based model to determine the protection remediation action, the machine learning-based model to process the protection event, an impact of the protection event on the one or more protection vectors, and user behaviors associated with the digital assets to determine the protection remediation action.

Example 38 includes the method of example 31, further including assign the protection remediation action a classification based on at least one of the digital assets associated with the protection remediation action or a user device utilized to access the digital asset.

Example 39 includes the method of example 31, further including identifying a user device of the protection threat surface associated with the protection remediation action, determining a time that a user frequently utilizes the user device, and causing the determined protection remediation action to be dispatched to the user device at the time.

Example 40 includes the method of example 31, wherein the protection threat surface includes user devices associated with more than one user.

Example 41 includes an apparatus comprising asset analyzing circuitry to monitor digital assets associated with a protection threat surface to detect a protection event, protection analyzing circuitry to determine one or more protection vectors associated with the protection threat surface in response to detection of the protection event, the one or more protection vectors including one or more values corresponding to an impact of the protection event on an overall protection posture associated with the protection threat surface, and protection generating circuitry to determine a protection remediation action for the digital assets based on the one or more protection vectors.

Example 42 includes the apparatus of example 41, further including protection selecting circuitry to prioritize the determined protection remediation action based on the impact of the determined protection remediation action on the overall protection posture of the digital assets.

Example 43 includes the apparatus of example 42, wherein the protection generating circuitry is to update the one or more protection vectors to correspond with an implementation of the protection remediation action, and determine an improvement to an overall protection efficacy score based on the one or more protection vectors to determine the impact of the determined protection remediation action.

Example 44 includes the apparatus of example 43, further including protection feedback circuitry to cause the improvement to the overall protection efficacy score to be dispatched to one or more user devices in response to the protection remediation action not being executed.

Example 45 includes the apparatus of example 41, further including protection selecting circuitry to determine a priority of the determined protection remediation action based on one or more impact weights associated with corresponding ones of the one or more protection vectors and notional values associated with the digital assets.

Example 46 includes the apparatus of example 41, wherein the protection generating circuitry is to utilize a rule-based model to determine the protection remediation action, the rule-based model to determine the protection remediation action based on the protection event and the impact of the protection event on the one or more protection vectors.

Example 47 includes the apparatus of example 41, wherein the protection generating circuitry is to utilize a machine learning-based model to determine the protection remediation action, the machine learning-based model to process the protection event, an impact of the protection event on the one or more protection vectors, and user behaviors associated with the digital assets to determine the protection remediation action.

Example 48 includes the apparatus of example 41, further including protection selecting circuitry to group the protection remediation action based on at least one of the digital assets associated with the protection remediation action or a user device utilized to access the digital asset.

Example 49 includes the apparatus of example 41, further including protection dispatching circuitry to identify at least one of the digital assets of the protection threat surface associated with the protection remediation action, determine a time that a user frequently utilizes the user device, and cause the determined protection remediation action to be dispatched to the user device at the time.

Example 50 includes the apparatus of example 41, wherein the protection threat surface includes user devices associated with more than one user.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   instructions in the apparatus; and
   processor circuitry to execute the instructions to:
   monitor digital assets associated with a protection threat surface to detect a protection event;
   determine one or more protection vectors associated with the protection threat surface in response to detecting the protection event, a first protection vector of the one or more protection vectors mapped to a respective protection capability associated with at least one of the digital assets, the first protection vector including at least two separate values, one or more of the at least two separate values corresponding to an impact of the protection event on an overall protection posture associated with the protection threat surface;
   determine a protection remediation action for the protection threat surface based on the one or more protection vectors;
   assign the protection remediation action to a group based on at least one of the digital assets associated with the protection remediation action or a first device utilized to access at least one of the digital assets associated with the protection remediation action; and
   cause the determined protection remediation action to be dispatched to the first device or a second device associated with at least one of the digital assets.

2. The apparatus of claim 1, wherein the processor circuitry is to determine a priority of the determined protection remediation action based on an impact of the determined protection remediation action on the overall protection posture.

3. The apparatus of claim 2, wherein the processor circuitry is to:
   update the one or more protection vectors to correspond to an implementation of the protection remediation action; and
   determine an improvement to an overall protection efficacy score based on the one or more protection vectors to determine the impact of the determined protection remediation action.

4. The apparatus of claim 3, wherein the processor circuitry is to cause the improvement to the overall protection efficacy score to be dispatched to one or more of the first device, the second device, or a third device in response to the protection remediation action not being executed.

5. The apparatus of claim 1, wherein the protection remediation action is a first protection remediation action and the protection event is a first protection event, wherein the processor circuitry is to:
   determine the one or more protection vectors based on at least one of the first protection event or a second protection event;
   determine a second protection remediation action for the protection threat surface based on the one or more protection vectors; and
   prioritize the first protection remediation action or the second protection remediation action based on impact weights associated with the one or more protection vectors and notional values associated with the digital assets.

6. The apparatus of claim 1, wherein the processor circuitry is to utilize a rule- based model to determine the protection remediation action, the rule-based model to determine the protection remediation action based on the protection event and an impact of the protection event on the one or more protection vectors.

7. The apparatus of claim 1, wherein the processor circuitry is to utilize a machine learning-based model to determine the protection remediation action, the machine learning-based model to process the protection event, an impact of the protection event on the one or more protection vectors, and user behaviors associated with the digital assets to determine the protection remediation action.

8. The apparatus of claim 1, wherein the processor circuitry is to:
   identify at least one of the digital assets of the protection threat surface associated with the protection remediation action;
   determine a time that a user frequently utilizes the first device or the second device; and
   cause the determined protection remediation action to be dispatched to the the first device or the second device at the time.

9. The apparatus of claim 1, wherein the protection threat surface includes user devices associated with more than one user, the user devices including the first device and the second device.

10. A non-transitory machine readable medium comprising instructions which, when executed, cause one or more processors to:
    monitor digital assets associated with a protection threat surface to detect a protection event;
    determine one or more protection vectors associated with the protection threat surface in response to detecting the protection event, a first protection vector of the one or more protection vectors mapped to a respective protection capability associated with at least one of the digital assets, the first protection vector including at least two separate values, one or more of the at least two separate values corresponding to an impact of the protection event on an overall protection posture associated with the protection threat surface;
    determine a protection remediation action for the protection threat surface based on the one or more protection vectors;
    assign the protection remediation action to a group based on at least one of the digital assets associated with the protection remediation action or a first device utilized to access at least one of the digital assets associated with the protection remediation action; and cause the determined protection remediation action to be dispatched to the first device or a second device associated with at least one of the digital assets.

11. The non-transitory machine readable medium of claim 10, wherein the instructions, when executed, cause the one or more processors to determine a priority of the determined protection remediation action based on an impact of the determined protection remediation action on the overall protection posture.

12. The non-transitory machine readable medium of claim 11, wherein the instructions, when executed, cause the one or more processors to:
update the one or more protection vectors to correspond with an implementation of the protection remediation action; and
determine an improvement to an overall protection efficacy score based on the one or more protection vectors to determine the impact of the determined protection remediation action.

13. The non-transitory machine readable medium of claim 12, wherein the instructions, when executed, cause the one or more processors to cause the improvement to the overall protection efficacy score to be dispatched to one or more of the first device, the second device, or a third device in response to the protection remediation action not being executed.

14. The non-transitory machine readable medium of claim 10, wherein the protection remediation action is a first protection remediation action and the protection event is a first protection event, wherein the instructions, when executed, cause the one or more processors to:
determine the one or more protection vectors based on at least one of the first protection event or a second protection event;
determine a second protection remediation action for the protection threat surface based on the one or more protection vectors; and
prioritize the first protection remediation action or the second protection remediation action based on impact weights associated with the one or more protection vectors and notional values associated with the digital assets.

15. The non-transitory machine readable medium of claim 10, wherein the instructions, when executed, cause the one or more processors to utilize a rule-based model to determine the protection remediation action, the rule-based model to determine the protection remediation action based on the protection event and an impact of the protection event on the one or more protection vectors.

16. The non-transitory machine readable medium of claim 10, wherein the instructions, when executed, cause the one or more processors to utilize a machine learning- based model to determine the protection remediation action, the machine learning-based model to process the protection event, an impact of the protection event on the one or more protection vectors, and user behaviors associated with the digital assets to determine the protection remediation action.

17. The non-transitory machine readable medium of claim 10, wherein at least one of the digital assets is associated with more than one user device.

18. An apparatus comprising:
means for monitoring digital assets associated with a protection threat surface to detect a protection event;
means for determining protection vectors associated with the protection threat surface in response to detecting the protection event, a first protection vector of the one or more protection vectors mapped to a respective protection capability associated with at least one of the digital assets, the first protection vector including at least two separate values, one or more of the at least two separate values corresponding to an impact of the protection event on an overall protection posture associated with the protection threat surface;
means for determining a protection remediation action for the protection threat surface based on the one or more protection vectors;
means for classifying the protection remediation action based on at least one of the digital assets associated with the protection remediation action or a first device utilized to access at least one of the digital assets associated with the protection remediation action; and
means for causing the determined protection remediation action to be dispatched to the first device or a second device associated with at least one of the digital assets.

19. The apparatus of claim 18, further including means for determining a priority of the determined protection remediation action based on an impact of the determined protection remediation action on the overall protection posture.

20. The apparatus of claim 19, wherein the means for determining the protection remediation action is to:
update the one or more protection vectors to correspond with an implementation of the protection remediation action; and
determine an improvement to an overall protection efficacy score based on the one or more protection vectors to determine the impact of the determined protection remediation action.

21. The apparatus of claim 20, further including means for causing the improvement to the overall protection efficacy score to be dispatched to one or more one or more of the first device, the second device, or a third device in response to the protection remediation action not being executed.

22. The apparatus of claim 18, further including means for determining a priority of the determined protection remediation action based on one or more impact weights associated with corresponding ones of the one or more protection vectors and notional values associated with the digital assets.

23. The apparatus of claim 1, wherein the at least two separate values of the first protection vector include two or more of (i) a first value indicative of an associated asset type, (ii) a second value indicative of a protection aspect that the respective protection capability provides, (iii) a third value indicative of a configuration of the respective protection capability, (iv) a fourth value indicative of a classification of the protection event, (v) a fifth value indicative of a user behavior associated with at least one of the digital assets, or (iv) a sixth value indicative of an impact of the first protection vector on the overall protection posture.

24. The apparatus of claim 1, wherein the first protection vector is associated with a first digital asset of the digital assets, wherein the at least two separate values of the first protection vector include a first value and a second value, wherein the first value corresponds to a switch, wherein the second value is a weight factor, and wherein the switch activates the weight factor for consideration in the determination of the protection remediation action in response to the respective protection capability being utilized in association with the first digital asset.

25. A method comprising:
monitoring digital assets associated with a protection threat surface to detect a protection event;
determining one or more protection vectors associated with the protection threat surface in response to detecting the protection event, a first protection vector of the one or more protection vectors mapped to a respective protection capability associated with at least one of the digital assets, the first protection vector including at least two separate values, one or more of the at least two separate values corresponding to an impact of the protection event on an overall protection posture associated with the protection threat surface;

determining a protection remediation action for the protection threat surface based on the one or more protection vectors;

assigning the protection remediation action to a group based on at least one of the digital assets associated with the protection remediation action or a first device utilized to access at least one of the digital assets associated with the protection remediation action; and causing the determined protection remediation action to be dispatched to the first device or a second device associated with at least one of the digital assets.

26. The method of claim 25, further including determining a priority of the determined protection remediation action based on an impact of the determined protection remediation action on the overall protection posture of the digital assets.

27. The method of claim 26, further including:
updating the one or more protection vectors to correspond with an implementation of the protection remediation action; and
determining an improvement to an overall protection efficacy score based on the one or more protection vectors to determine the impact of the determined protection remediation action.

28. The method of claim 27, further including causing the improvement to the overall protection efficacy score to be dispatched to one or more user devices in response to the protection remediation action not being executed.

29. An apparatus comprising:
asset analyzing circuitry to monitor digital assets associated with a protection threat surface to detect a protection event;
protection analyzing circuitry to determine one or more protection vectors associated with the protection threat surface in response to detection of the protection event, a first protection vector of the one or more protection vectors mapped to a respective protection capability associated with at least one of the digital assets, the first protection vector including at least two separate values, one or more of the at least two separate values corresponding to an impact of the protection event on an overall protection posture associated with the protection threat surface;
protection generating circuitry to determine a protection remediation action for the digital assets based on the one or more protection vectors;
protection selecting circuitry to group the protection remediation action based on at least one of the digital assets associated with the protection remediation action or a first device utilized to access at least one of the digital assets associated with the protection remediation action; and
protection dispatching circuitry to cause the determined protection remediation action to be dispatched to the first device or a second device associated with at least one of the digital assets.

30. The apparatus of claim 29, further including protection selecting circuitry to determine a priority of the determined protection remediation action based on one or more impact weights associated with corresponding ones of the one or more protection vectors and notional values associated with the digital assets.

* * * * *